US010166414B1

(12) United States Patent
Thaw

(10) Patent No.: US 10,166,414 B1
(45) Date of Patent: Jan. 1, 2019

(54) HANDHELD FORCIBLE ENTRY DEVICE

(71) Applicant: Richard E. Thaw, West Palm Beach, FL (US)

(72) Inventor: Richard E. Thaw, West Palm Beach, FL (US)

( * ) Notice: Subject to any disclaimer, the term of this patent is extended or adjusted under 35 U.S.C. 154(b) by 158 days.

(21) Appl. No.: 15/374,302

(22) Filed: Dec. 9, 2016

Related U.S. Application Data

(63) Continuation-in-part of application No. 13/943,563, filed on Jul. 16, 2013, now Pat. No. 9,517,363, which is a continuation-in-part of application No. 12/786,630, filed on May 25, 2010, now Pat. No. 8,485,508.

(60) Provisional application No. 61/181,537, filed on May 27, 2009.

(51) Int. Cl.

| | |
|---|---|
| ***B23Q 3/06*** | (2006.01) |
| ***A62B 3/00*** | (2006.01) |
| ***E05B 19/20*** | (2006.01) |
| ***B66F 11/00*** | (2006.01) |

(52) U.S. Cl.
CPC .............. *A62B 3/005* (2013.01); *B66F 11/00* (2013.01); *E05B 19/20* (2013.01)

(58) Field of Classification Search
CPC ............. B66F 3/18; B66F 5/025; A62B 3/005
See application file for complete search history.

(56) References Cited

U.S. PATENT DOCUMENTS

| | | | | |
|---|---|---|---|---|
| 3,904,177 A | 9/1975 | Dalton | | |
| 4,657,225 A * | 4/1987 | Hoehn | A62B 3/005 | 254/100 |
| 4,896,862 A | 1/1990 | Ganley | | |
| 4,996,862 A | 3/1991 | Schroers | | |
| 5,048,795 A * | 9/1991 | Vitale | A62B 3/005 | 254/93 R |
| 5,855,360 A | 1/1999 | Wurdack | | |
| 6,880,809 B2 * | 4/2005 | Stephen | A62B 3/005 | 254/105 |
| 7,152,848 B2 | 12/2006 | Pfleging, Jr. et al. | | |
| 7,434,785 B1 * | 10/2008 | McMorrow | A62B 3/005 | 254/134 |
| 8,485,508 B1 * | 7/2013 | Newman | E05B 19/20 | 254/100 |

(Continued)

*Primary Examiner* — Tyrone V Hall, Jr.
(74) *Attorney, Agent, or Firm* — H. John Rizvi; Gold & Rizvi, P.A.

(57) ABSTRACT

A handheld forcible entry device includes a tubular housing. A torque-input drive shaft is rotationally assembled to the housing, wherein the input shaft rotates about an axis perpendicular to a longitudinal axis of the housing. A helical pressure applicating lead screw is rotationally assembled to the housing, wherein the lead screw rotates about an axis parallel to the housing longitudinal axis. The input shaft and lead screw are rotationally synchronized by a gear assembly. A pressure applicator is threadably engaged with a helical threaded segment integrated in the lead screw. Rotation of the threading advances or retracts the pressure applicator from a stationary wedge plate. The separation of the pressure applicator and the stationary wedge plate separates a locked member from the associated frame, thus forcibly opening the locked member. The input shaft can be operated using a manually applied rotation or power applied rotation.

20 Claims, 35 Drawing Sheets

(56) References Cited

U.S. PATENT DOCUMENTS

2009/0321696 A1* 12/2009 Birkholz .................. B60S 9/08
254/419

* cited by examiner

HANDHELD FORCIBLE ENTRY DEVICE

CROSS REFERENCE TO RELATED APPLICATIONS

This application is a Continuation-In-Part claiming the benefit of United States Non-Provisional Utility patent application Ser. No. 13/943,563, filed on Jul. 16, 2013, which in turn is a Continuation-In-Part claiming the benefit of United States Non-Provisional Utility patent application Ser. No. 12/786,630, filed on May 25, 2010 and issued as U.S. Pat. No. 8,485,508 on Jul. 16, 2013, which claims the benefit of U.S. Provisional Patent Application Ser. No. 61/181,537, filed on May 27, 2009, all of which are incorporated herein in their entireties.

FIELD OF THE INVENTION

This invention relates generally to a handheld, mechanical or powered locked door opening device, light in weight and operable in any orientation, for generating a substantial door-opening force. More particularly, the locked door-opening device is capable of providing a set of useful features for emergency personnel using a simple portable device.

DESCRIPTION OF THE PRIOR ART

Forcible entry is a technique used to gain access to a structure whose normal means of access is locked, blocked, or nonexistent.

There are several situations in which a forcible entry is required. Some of the most common are: rescue, escape, fire, preventing further property loss, accessing areas critical to pass through, and the like. Each different forcible entry always involves forcing an opening of a door or a window, wherein the process utilizes a specific tool or series of tools for the respective application.

Depending on the physical structure and function, the tools used during a forcible entry may be classified as: striking tools, prying tools, hydraulic tools, lock pulling tools, cutting tools, and the like.

Examples of striking tools include a flat-head axe, a sledgehammer, a battering ram, a hammer, a duck-billed lock breaker, and the like.

The flat-head axe, whose primary use is for breaking down doors, comprises a chrome-plated or steel flat head attached to a distal end of a wooden, plastic, or composite handle. The flat head axe is heavy enough for a short strike stroke on an iron or padlock breaker, wherein the axes' large oversized head increases accuracy when targeting a strike stroke zone. The flat head axe includes a cutting edge, which is usually annealed to increase the longevity of the edge.

A sledgehammer, comprising a large, flat head attached to a handle, can apply a great impulse due to its large size and distribute force over a wide area. The sledgehammer is commonly used by police forces to gain entry by force during in raids on property. The entry is commonly accomplished by forcing entry through one or more doors.

Battering rams comprise a large heavy metal ram carried by two people and propelled to apply a force against an obstacle. Battering rams are commonly used by SWAT teams, military personnel, or similar groups for forcibly opening locked doors to gain entry to a structure. Other modern battering rams include a cylinder in which a piston gets fired automatically upon impact, which enhances the momentum of the impact significantly.

Hammers are a smaller version of sledgehammers, thus being significantly more portable. Hammers are often used to gain entry through weaker wooden doors or windows.

A duck-billed lock breaker is an all steel tapered head designed to be placed in the shackle of a padlock and when hit with a mallet or the back of an axe easily spreads the shackle open.

Examples of prying tools include a Halligan bar, an adz bar and a pry bar.

The Halligan bar is a specialty tool commonly used by fire and rescue personnel. The Halligan is a multi-purpose prying tool consisting of a claw (or fork), a blade, and a pick, which is especially useful in quickly breaking through many types of locked doors. The fork end of the tool can be used to break in through an outward swinging door by forcing the tool between the door and doorjamb and prying the two apart. Along with the K-tool and the adz or fork end a lock can easily be pulled. There are many other uses of the Halligan tool, including vehicle rescue and opening of walls. A Halligan bar and an axe can be joined together to form what is known as a married set, or set of irons.

The adz bar is a tool for all operations from forcible entry, to search and overhaul. This tool is a Halligan tool, except that an adz replaces the traditional fork on the end of the bar. The adz is gently curved and thin enough to penetrate those tight spaces during forcible entry operations.

The pry bar or more informally referred to as a jimmy bar, or gooseneck is a tool comprising a metal bar with a single curved end and flattened points. A small fissure is often integrated into at least one of the two ends of the pry bar. The pry bar is generally used as a lever to either force apart two objects or remove nails. Larger pry bars are referred to as crowbars. Crowbars are commonly used for prying two (2) items assembled to one another apart, smashing objects, and the like. Crowbars can be used as any of the three lever classes but the curved end is usually used as a first-class lever, and the flat end as a 2nd class lever.

Examples of hydraulic tools include: the Rabbit Tool, the Port-A-Power and the like.

Commercially known as the rabbit tool, this is a one-piece integrated hydraulic forcible entry tool comprising an 11 lb., 13-inch long unit for cutting locks, bars and locking devices. It has stainless steel jaws with a spreading force and cutting force of 8,000 lbs. and features ¼" teeth that allow for easy placement between a door and its jamb. Using the hand operated pump, the Rabbit can spread a door 4" in 20-30 seconds.

Commercially known as the Port-A-Power, this tool is a portable pump unit associated with a 10 Ton hydraulic ram capable of creating a huge slamming force against any type of entries.

Another powered tool known in the art comprises an airless handheld hydraulic pump unaffected by gravity that continuously maintains pressure on the fluid in a dynamic reservoir chamber to enable pumping into a dynamic pressure chamber for actuating a forcing rod irrespective of the orientation of the pump. A release valve permits fluid return from the pressure chamber into the reservoir chamber. The pump can be fitted with a tool such as a door forcer.

The manual tools described above are useful for helping the firefighters and law enforcement agents to open weak doors, which can be opened using a regular lever or slamming force, but they are useless for opening strong doors. Instead, the hydraulic devices mentioned above are useful for opening strong doors, however they present the following drawbacks:

Hydraulic units create major problems by usually blowing out O-ring seals. Major leaks of oil create a dangerous spreading of toxic chemicals to the environment as well as the emission of fumes into the air. Furthermore, an extreme explosive surge is also created when seals are blown under pressure;

Secondary cylinders and hoses are required;

Hydraulics cannot be inverted with usage;

In most cases the door is ruined after it is opened;

Because of the internal fluids used in its hydraulic circuit, it cannot operate under extreme weather conditions; and They require excessive regular maintenance when is not being used.

Pneumatic devices including an inner air pressurized container are another known solution in the market. These are similar to the hydraulic ones, with the following drawbacks:

Limited time use;

Require filtering of air;

Difficult to control the movement of components using air;

Pressurized gas being extremely dangerous for use in hot or cold environments;

Constant and heavy maintenance; and

Heavy carrying accessory chargers.

Therefore, a reliable fully mechanical or powered portable forcible entry device capable of avoiding the above-mentioned problems with a simple, low-maintenance and economical structure is still desired.

BRIEF SUMMARY OF THE INVENTION

This invention is directed towards a mechanical or powered handheld door opener device, light in weight and operable in any orientation, included inverted, for generating a substantial door-opening force with a minimum effort from the user.

In a first implementation of the invention, a handheld forcible entry device includes a tubular housing formed extending along a longitudinal axis between a proximal end and a distal end of the tubular housing. A torque application end is provided at an exposed portion of the forcible entry device, the torque application end configured to rotate about a torque application axis arranged in a transverse direction generally perpendicular to the longitudinal axis of the tubular housing. The forcible entry device further includes a lead screw comprising a threaded body extending between a proximal end and a distal end of the lead screw. The lead screw is housed within and rotationally assembled to the tubular housing. The lead screw is formed about a lead screw axis oriented generally parallel to the longitudinal axis of the tubular housing. In addition, the forcible entry device includes a gear assembly comprising a gear connecting portion coupled to the proximal end of the lead screw providing unison rotation therewith about the lead screw axis. The gear assembly converts a rotation of the torque application end about the torque application axis into a rotation of the gear connecting portion of the gear assembly about the lead screw axis. A movable platform is threadingly engaged with the threaded body of the lead screw. The forcible entry device further includes a fixed wedge plate and a movable wedge plate. The fixed wedge plate is assembled to the distal end of the tubular housing and includes an operating edge. The movable wedge plate is also provided with an operating edge. One or more columns are arranged within the housing. Each column has a distal end and a proximal end. The proximal end of each column is assembled to the movable platform and the distal end of each column is assembled to the movable wedge plate. When a torque is applied to the torque application end and rotates the torque application end, the torque rotates the gear connecting portion of the gear assembly, which in turn rotates the lead screw in unison therewith. Rotation of the lead screw causes a translation of the movable platform in a direction parallel to the lead screw axis. The translation of the movable platform causes a translation of the column(s). The translation of the column(s) moves the movable wedge plate away from or towards the fixed wedge plate.

In a second aspect, the fixed wedge plate can further include at least one through bore. Each column can extend through a respective through bore.

In another aspect, the fixed wedge plate can further include a foot. The operating edge of the fixed wedge plate can be formed along an edge of the foot.

In another aspect, the movable wedge plate can further include a clearance. The foot of the fixed wedge plate can nest within the clearance.

In yet another aspect, the movable wedge plate and the foot of the fixed wedge plate can further include a respective exposed surface. The respective exposed surfaces of the movable wedge plate and the foot of the fixed wedge plate can be coplanar when the foot is positioned nesting within the clearance of the movable wedge plate.

In another aspect, the forcible entry device can include a plurality of columns arranged in spaced-apart and parallel relationship with one another.

In another aspect, the forcible entry device can further include a stationary thrust platform assembled to the tubular housing. The proximal end of the lead screw can be rotationally supported by the stationary thrust platform, such as by a bearing carried by the stationary thrust platform.

In yet another aspect, the distal end of the lead screw can be rotationally supported by the fixed wedge plate, such as by a bearing carried by the fixed wedge plate.

In another aspect, the forcible entry device can further include a torque applicator engaged with the torque application end of the torque-input drive shaft for unison rotation therewith. In different implementations of the invention, the torque applicator can be manually-operable or powered.

This invention provides major advantages over current similar technologies. The following are just some of the benefits provided by the forcible entry device of the present invention:

the unit can be 100% mechanical, no hydraulics (oil) or pneumatics (air) necessarily involved, allowing the device to be environmentally friendly or 'green' and also requiring little or no maintenance;

no hoses are necessary;

unlimited shelf life;

the device is lighter in weight compared to hydraulic and pneumatic devices;

the device is high impact resistant for very abusive environments and industries, including fire departments, military, police, the DEA, SWAT, FBI and CIA;

specialized components can be provided in the device that develop high thrust with light operational functions;

the device can provide a greater thrust than other units on the market; in fact, the thrust and compressive structure can be approximately eight (8) times more than a thrust level required to open the most difficult entry system;

the device can be water resistant;

the unit can be made of high-impact and heat treated materials specifically designed for use in harsh environments;

various attachments can be installed for various operations and activities such as: pressure-breaking locks, opening locked doors (of all sorts), locking or wedging and jacking applications;

all the interior structured components and systems can be achieved by non-standard components in order to be able to develop the thrust and force that this unit can perform, each of these components being specifically designed to work with each other to achieve the desired output;

the device can be compliant with 'ANSI' standards;

the device has a self-contained, compact design, requiring less storage space;

the device is manufactured and can be used as a 'user friendly' and one-man operational unit;

any type of door system can be opened: solid core doors, metal doors, steel industrial doors, swing-in and swing-out doors, etc.

in most cases, the door is not ruined after it is opened using the device;

the device can have a high 'IZOD' impact rating; and the device is designed and can operate in extreme hot or cold environments, such as from −20° F. to +290° F.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION OF THE PRESENT INVENTION

Figure 1:
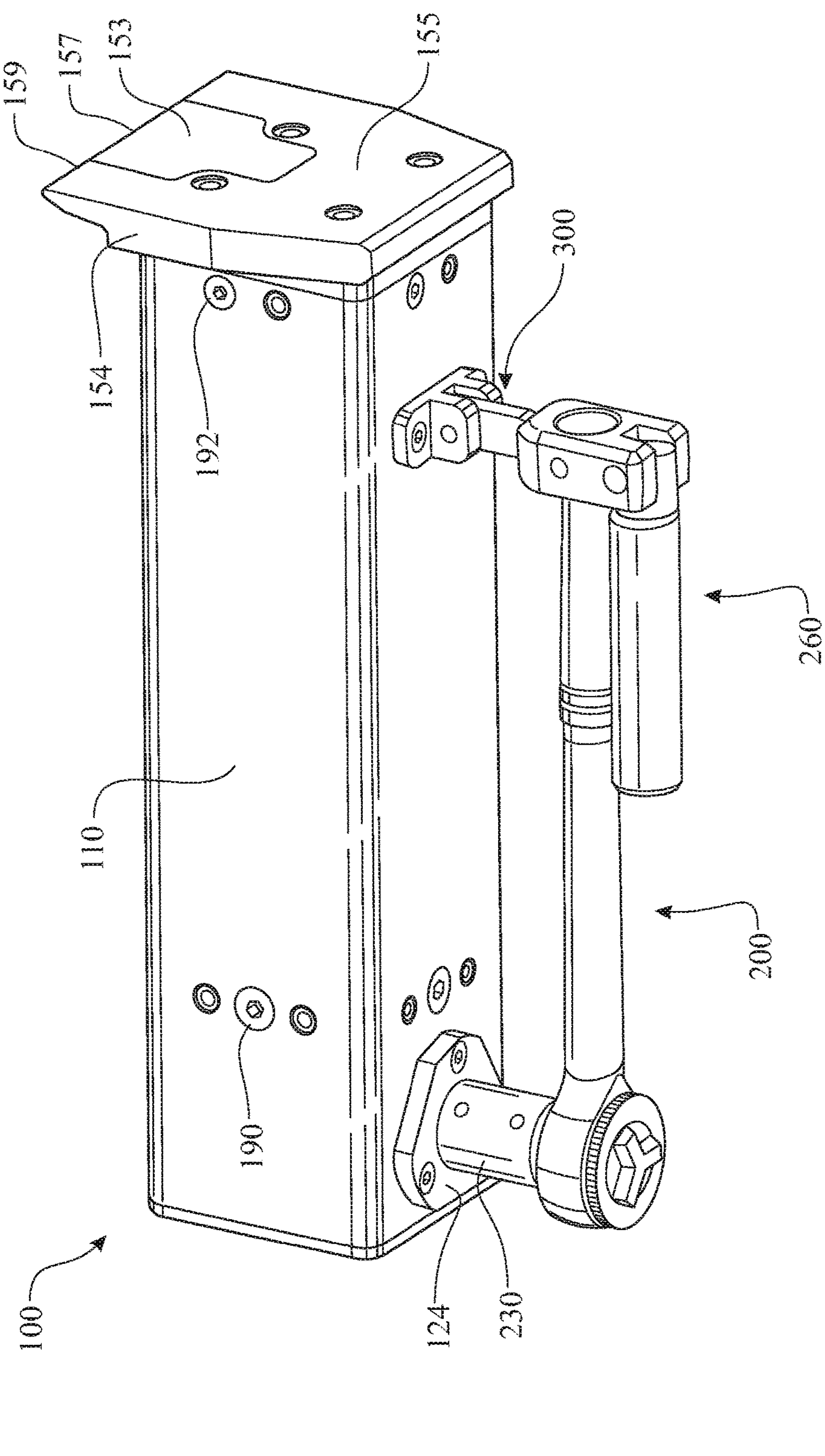
FIG. 1 presents an isometric view of a first exemplary handheld forcible entry device in accordance with the present invention, illustrated with an operational handle placed in a locked configuration.
Figure 2:
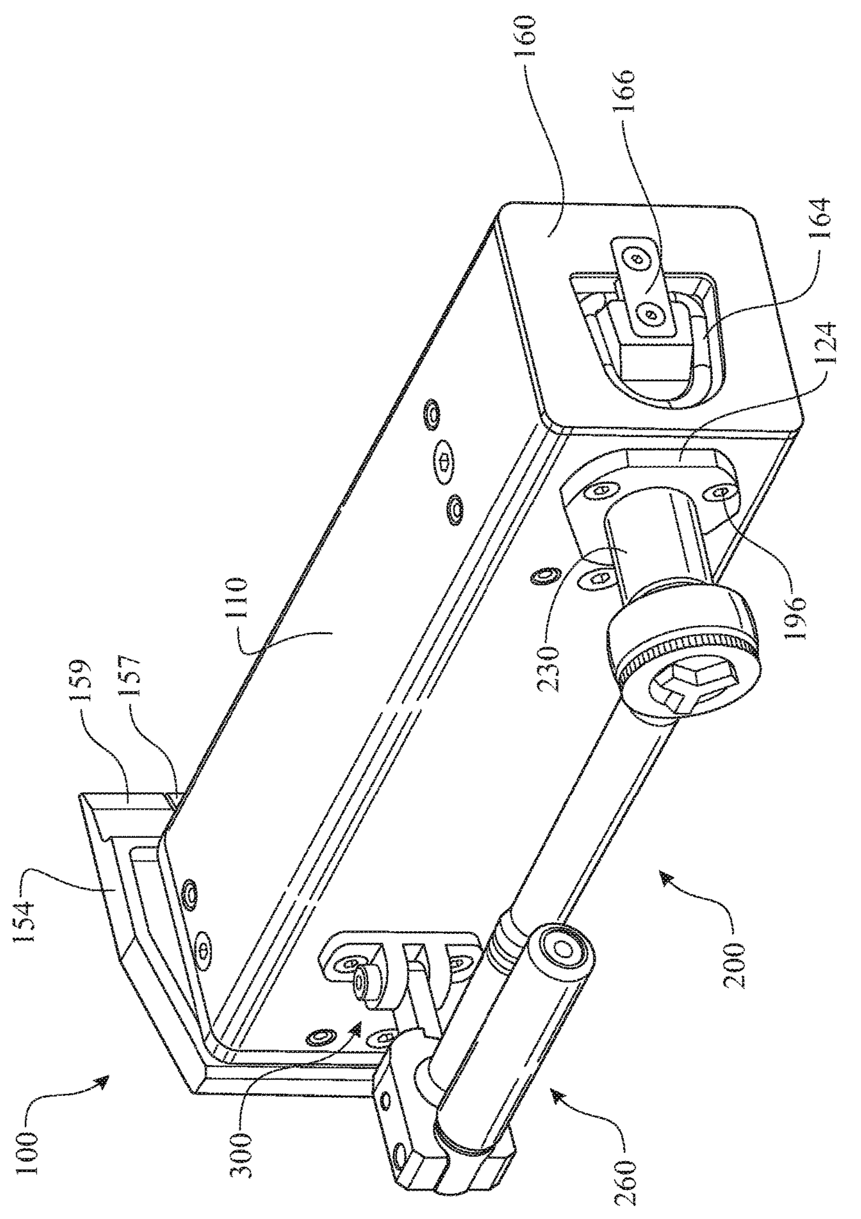
FIG. 2 presents a second isometric view of the handheld forcible entry device originally introduced in FIG. 1, wherein the illustration details an upper end thereof, introducing a carrying ring recessed into the face of the upper cap.
Figure 3:
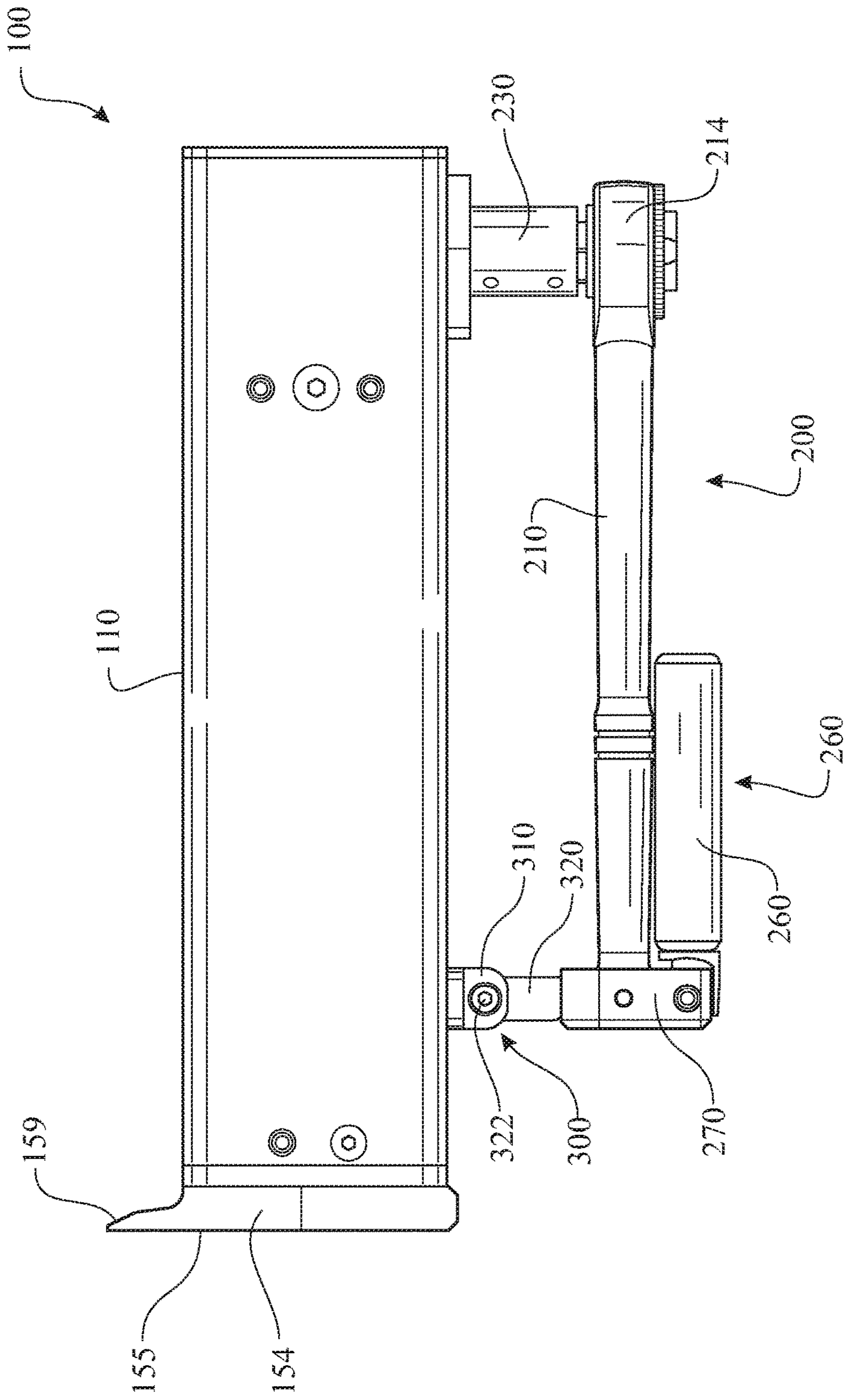
FIG. 3 presents a side elevation view of the first exemplary handheld forcible entry device originally introduced in FIG. 1, detailing a lateral handle comprising a ratchet mechanism.
Figure 4:
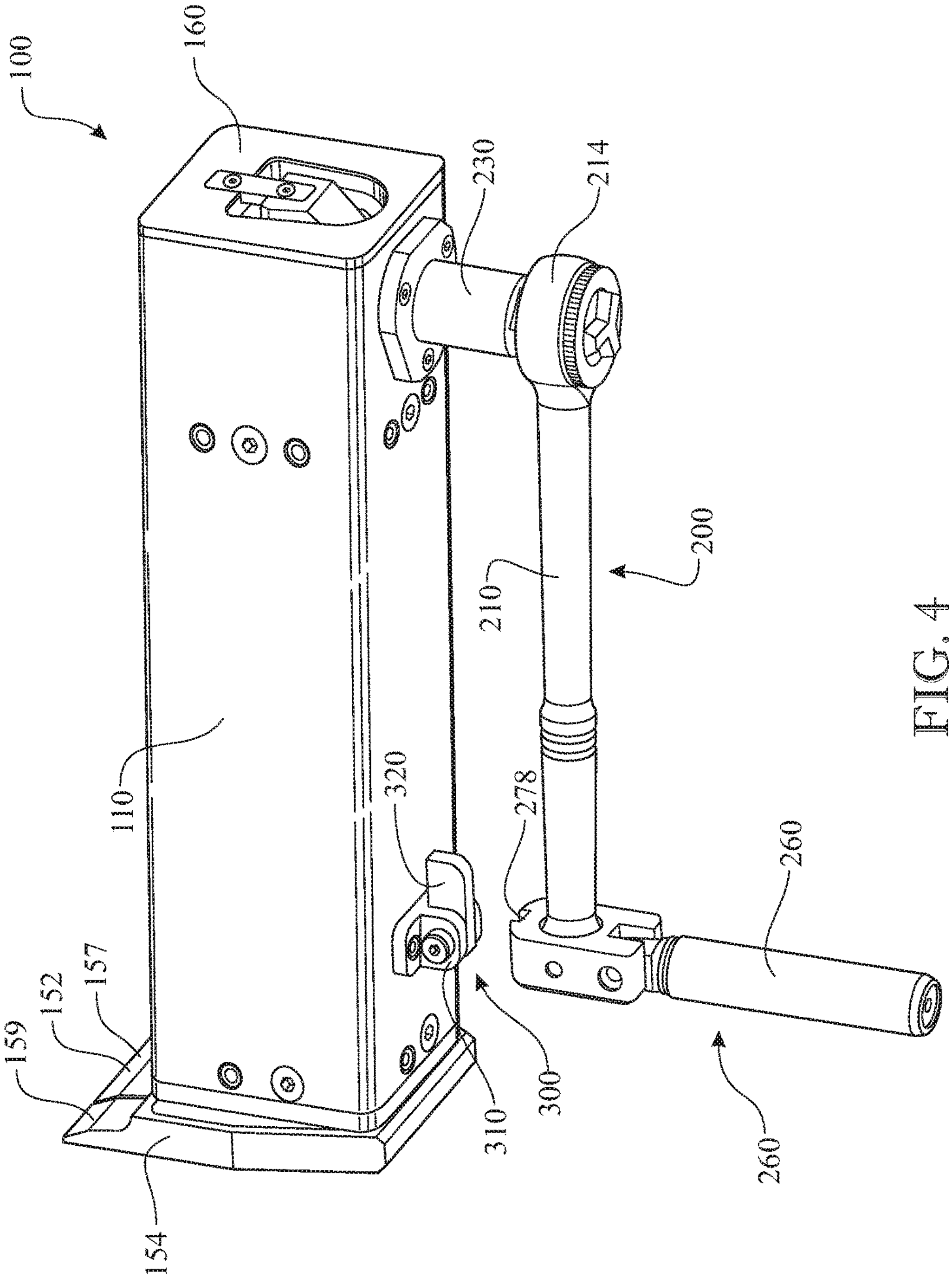
FIG. 4 presents another isometric view of the first exemplary handheld forcible entry device originally introduced in FIG. 1, wherein the illustration presents a locking mechanism for securing the operational handle, wherein the locking mechanism is shown in an unlock position.
Figure 5:
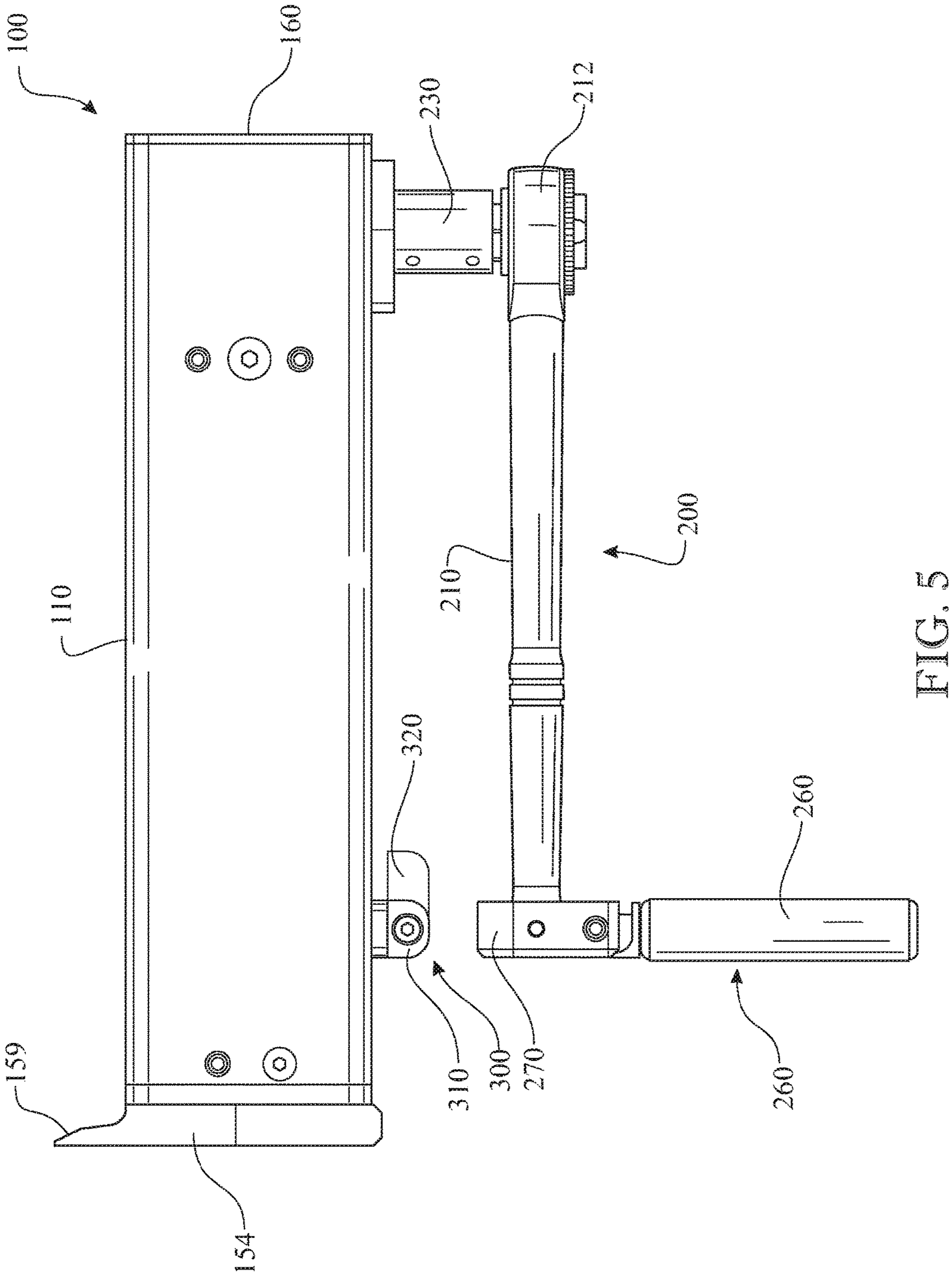
FIG. 5 presents a side elevation view of the first exemplary handheld forcible entry device originally introduced in FIG. 1, wherein the illustration presents a locking mechanism for securing the operational handle, wherein the locking mechanism is shown in an unlock position.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms “upper”, “lower”, “left”, “rear”, “right”, “front”, “vertical”, “horizontal”, and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

An exemplary embodiment of a mechanically-operated handheld forcible entry device 100 is presented in FIGS. 1 through 18. The forcible entry device 100 is a mechanically operated device used to forcibly separate a closure (such as a door, a window, a gate, and the like) and a respective closure frame (such as a door frame, a window frame, a fence, and the like) from one another, thus dislodging the locking mechanism extending between the closure and the respective closure frame. The forcible entry device 100 is an assembly comprising several interacting subassemblies, including a torque-input drive shaft subassembly, which engages with a pressure-applicating lead screw subassembly, which drives a pressure-generating subassembly to generate a separation force applied by a separation of a fixed wedge plate 150 and a pressure-applicating, movable wedge plate 154. The operational subassemblies are integrated into a tubular housing 110. A torque is applied to the torque-input drive shaft subassembly by an operational drive ratchet 200.

Figure 6:
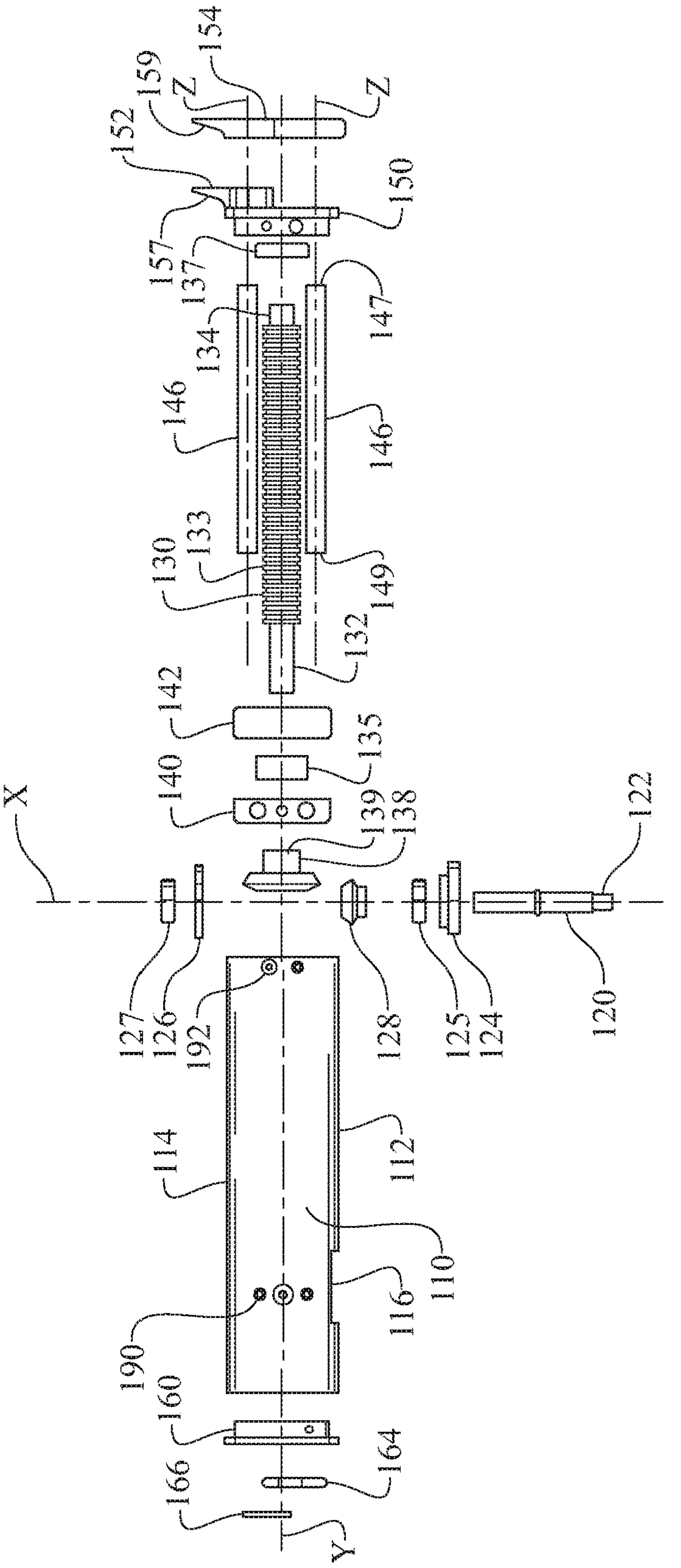
FIG. 6 presents a top exploded assembly plan view of the handheld forcible entry device originally introduced in FIG. 1, introducing the internal operational components of the first exemplary handheld forcible entry device originally introduced in FIG. 1.
Figure 7:
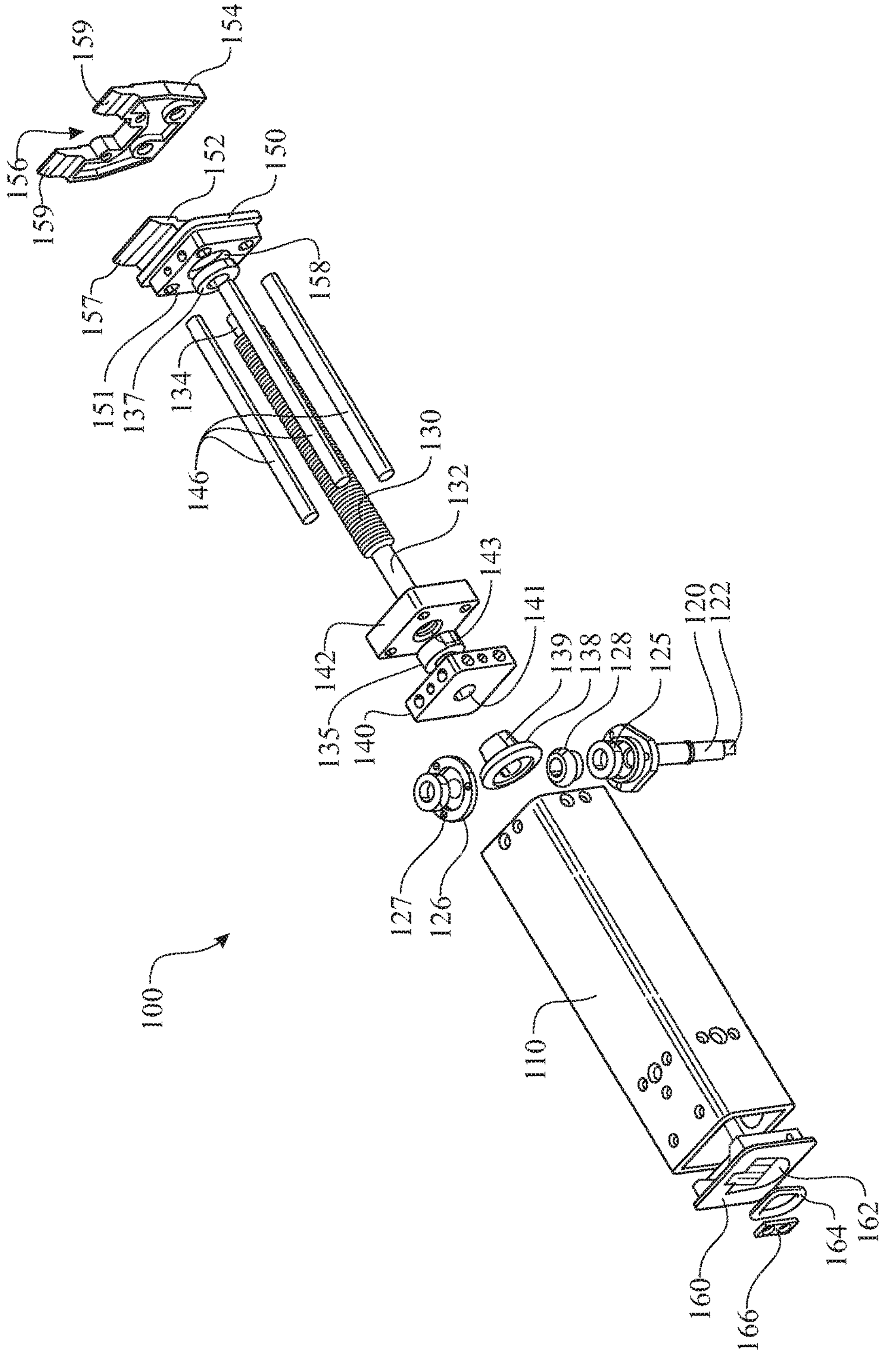
FIG. 7 presents a first isometric exploded assembly view of the handheld forcible entry device originally introduced in FIG. 1, detailing the internal operational components of the first exemplary handheld forcible entry device originally introduced in FIG. 1.
Figure 8:
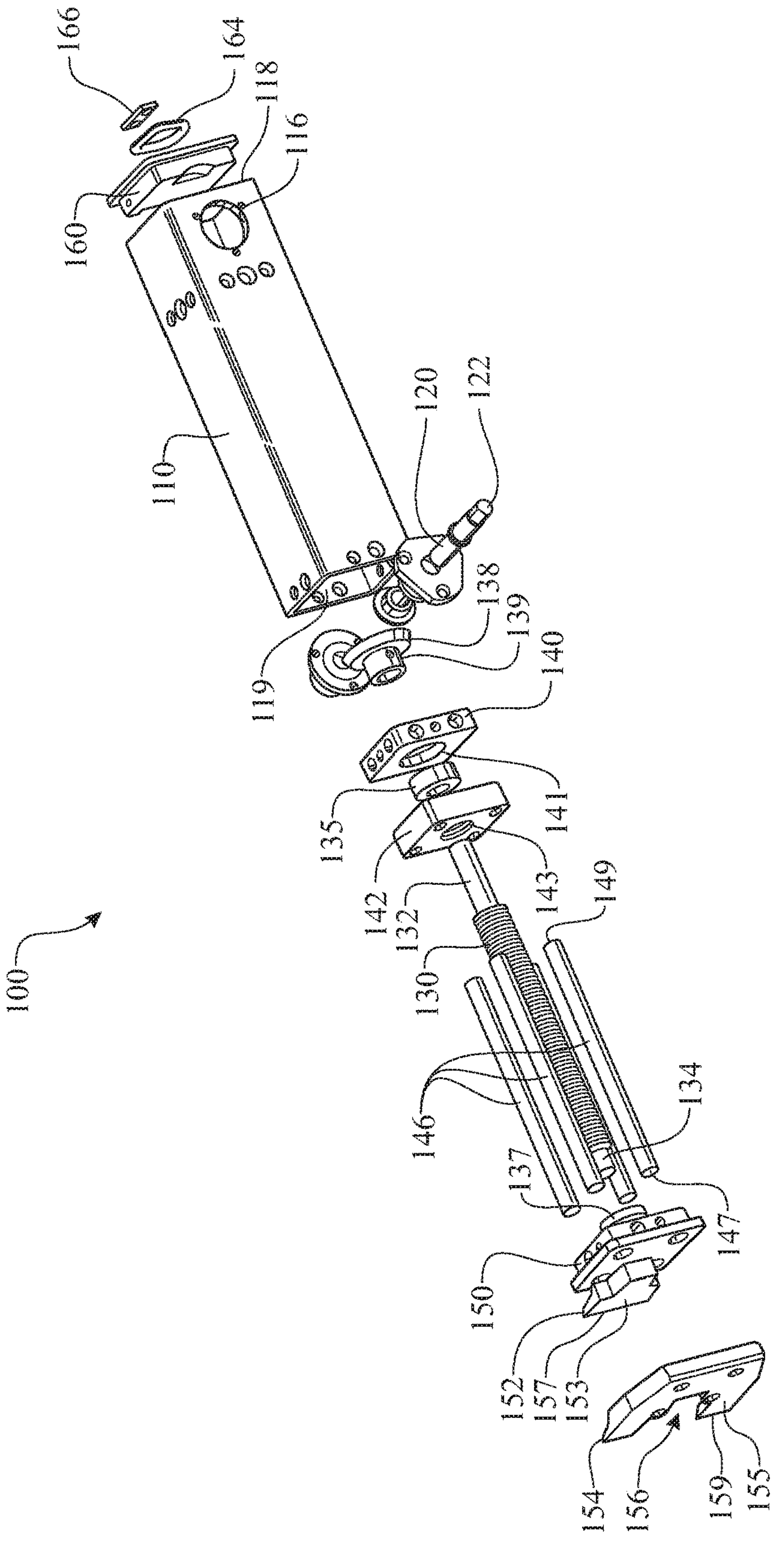
FIG. 8 presents a second isometric exploded assembly view of the handheld forcible entry device originally introduced in FIG. 1, detailing the internal operational components of the first exemplary handheld forcible entry device originally introduced in FIG. 1.
Figure 9:
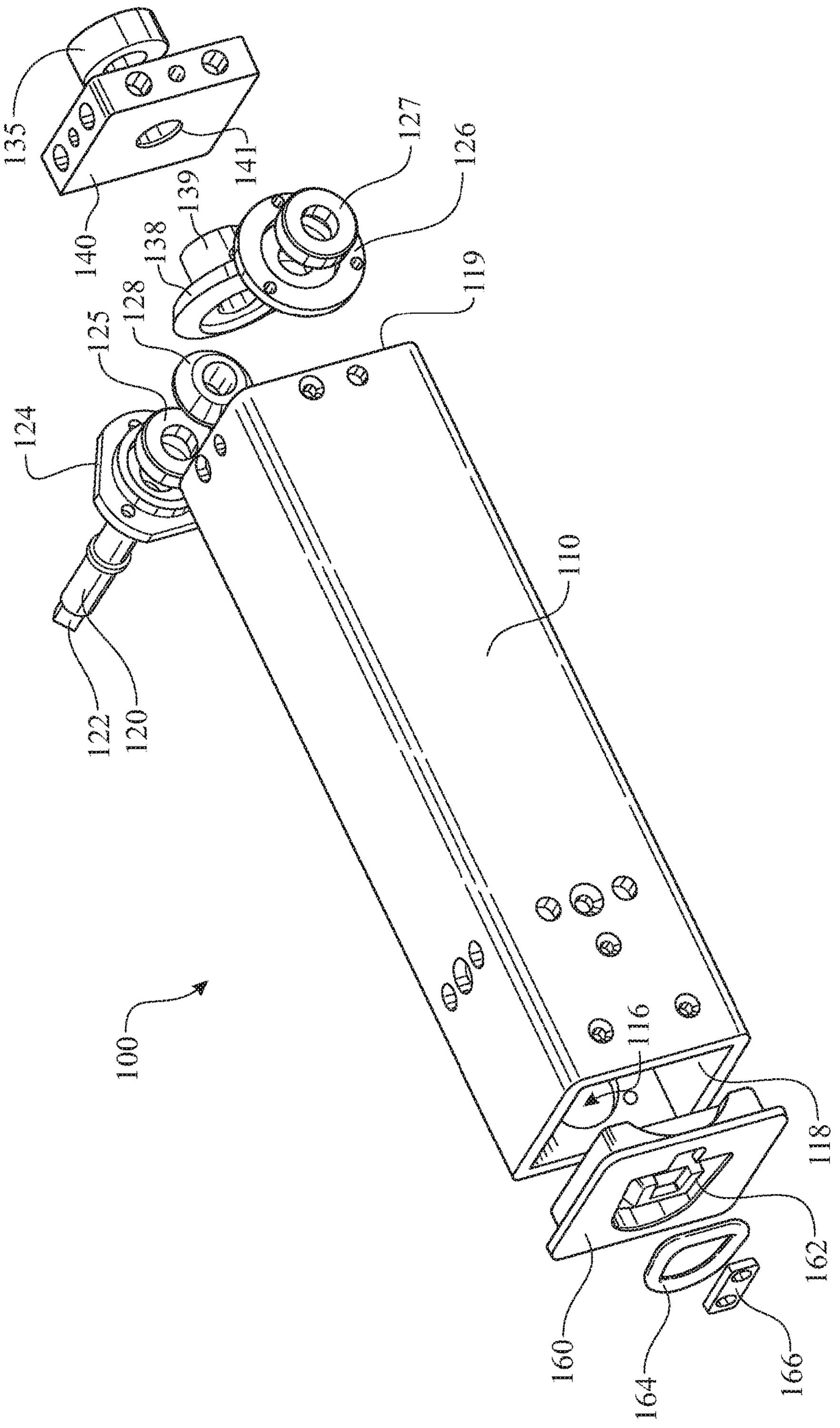
FIG. 9 presents another isometric partially exploded assembly view of the handheld forcible entry device originally introduced in FIG. 1, detailing assembly of the carrying ring to the upper cap and assembly of a pair of bevel operational gears.
Figure 10:
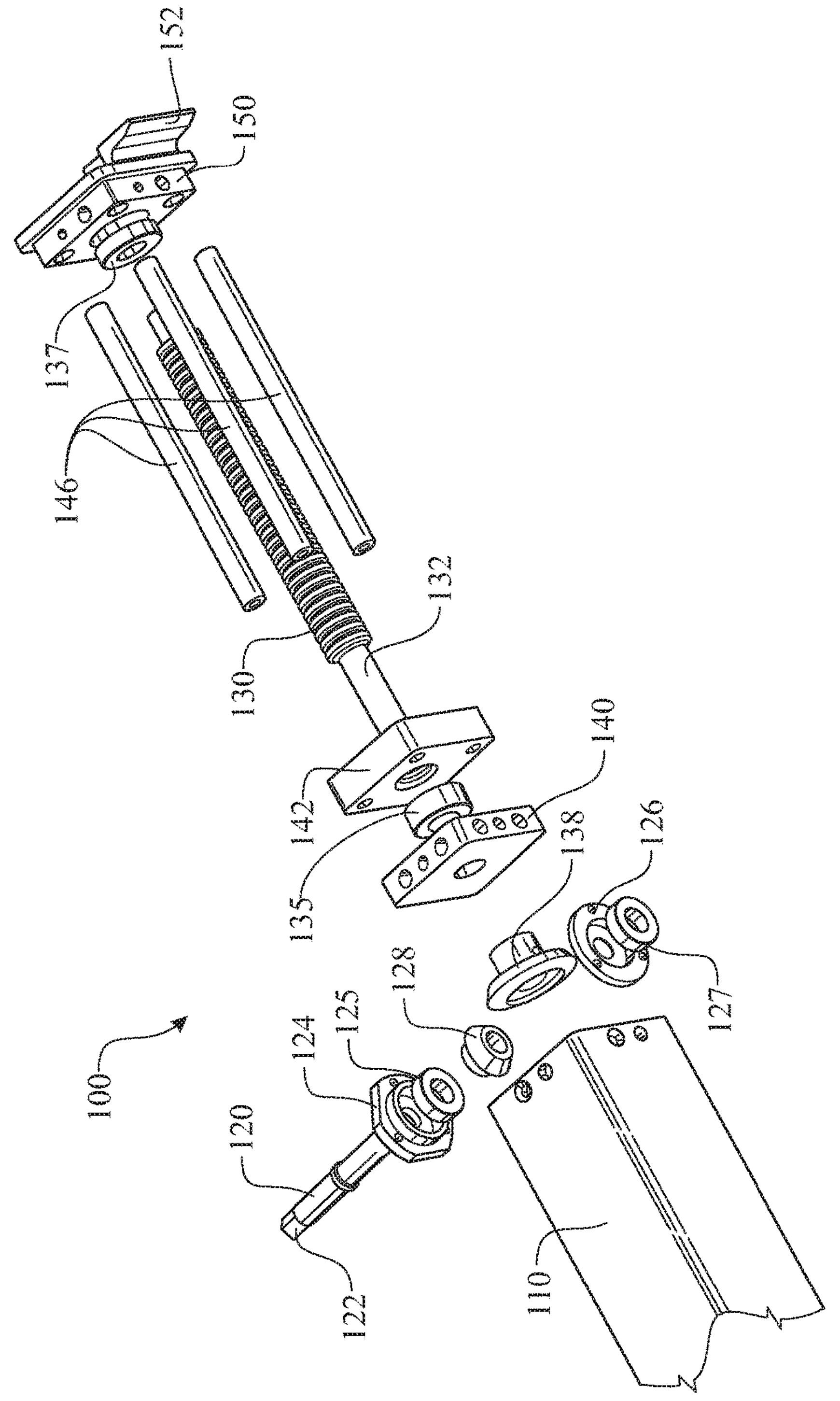
FIG. 10 presents another isometric partially exploded assembly view of the handheld forcible entry device originally introduced in FIG. 1, detailing the internal components including the bevel gears, a lead screw, and four columns.
Figure 11:
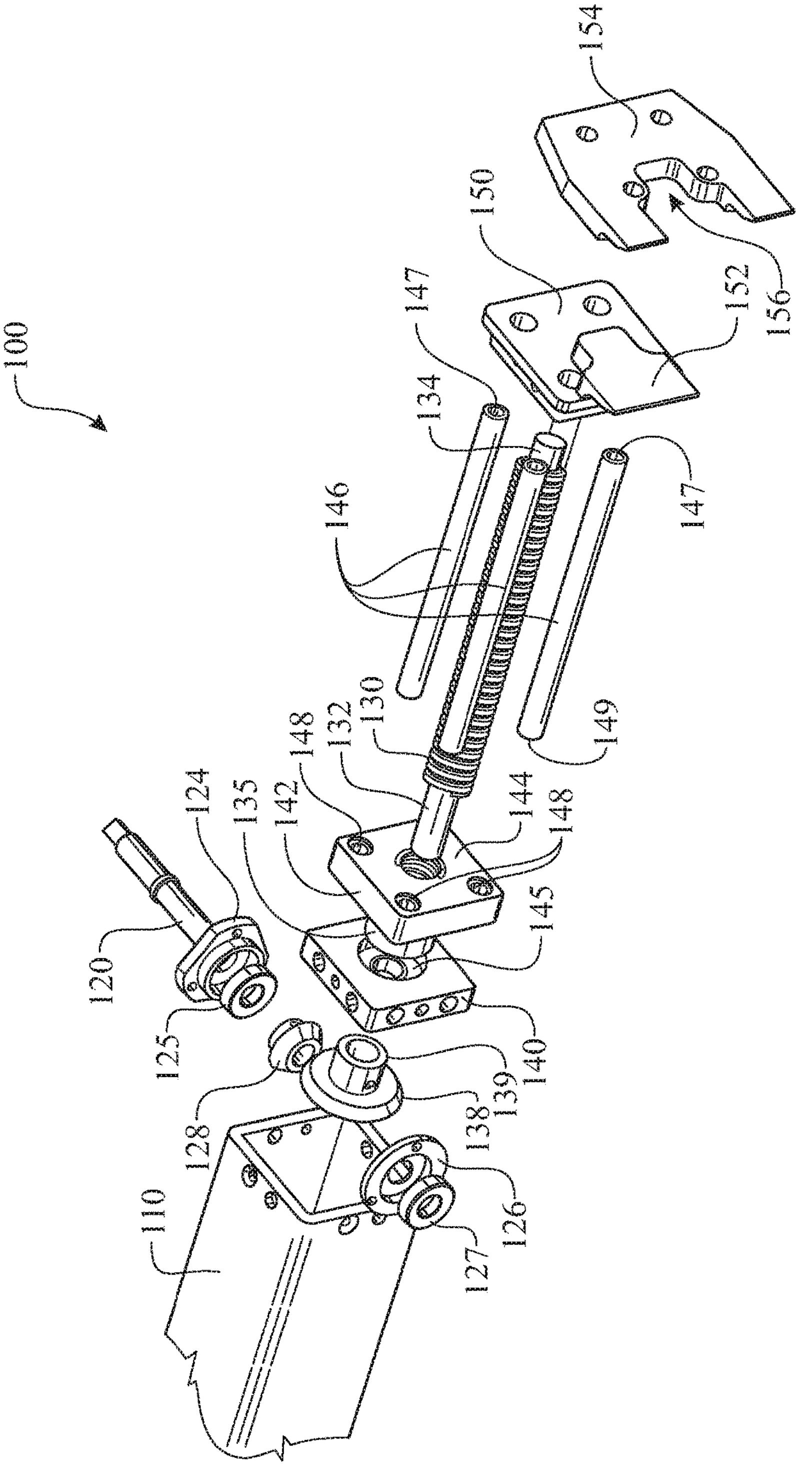
FIG. 11 presents another isometric exploded assembly view of the handheld forcible entry device originally introduced in FIG. 1, detailing a stationary thrust platform and a movable platform.
Figure 12:
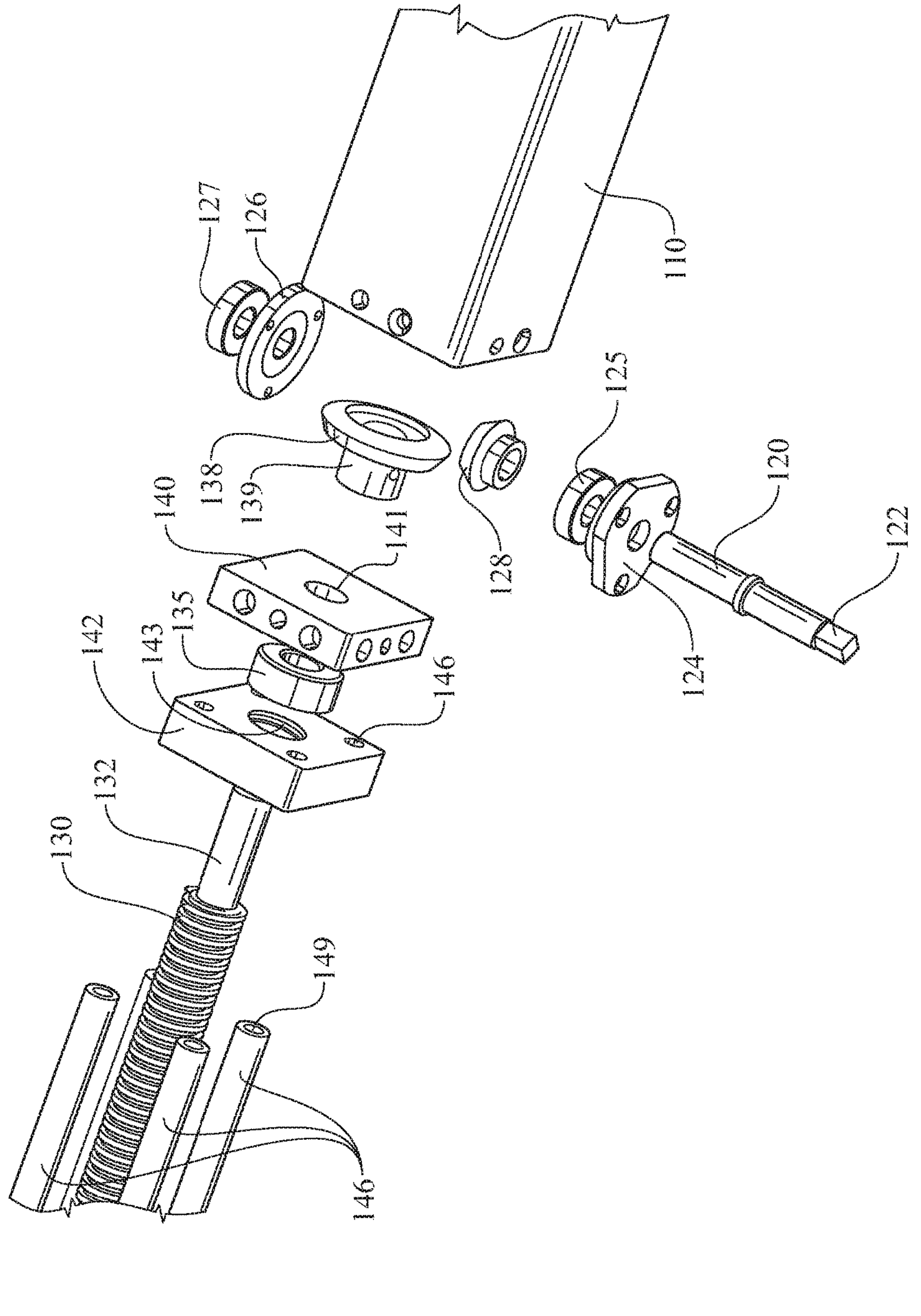
FIG. 12 presents a magnified isometric exploded assembly view of the handheld forcible entry device originally introduced in FIG. 1, detailing a relational arrangement between a torque input subassembly and pressure applicating subassembly.
Figure 13:
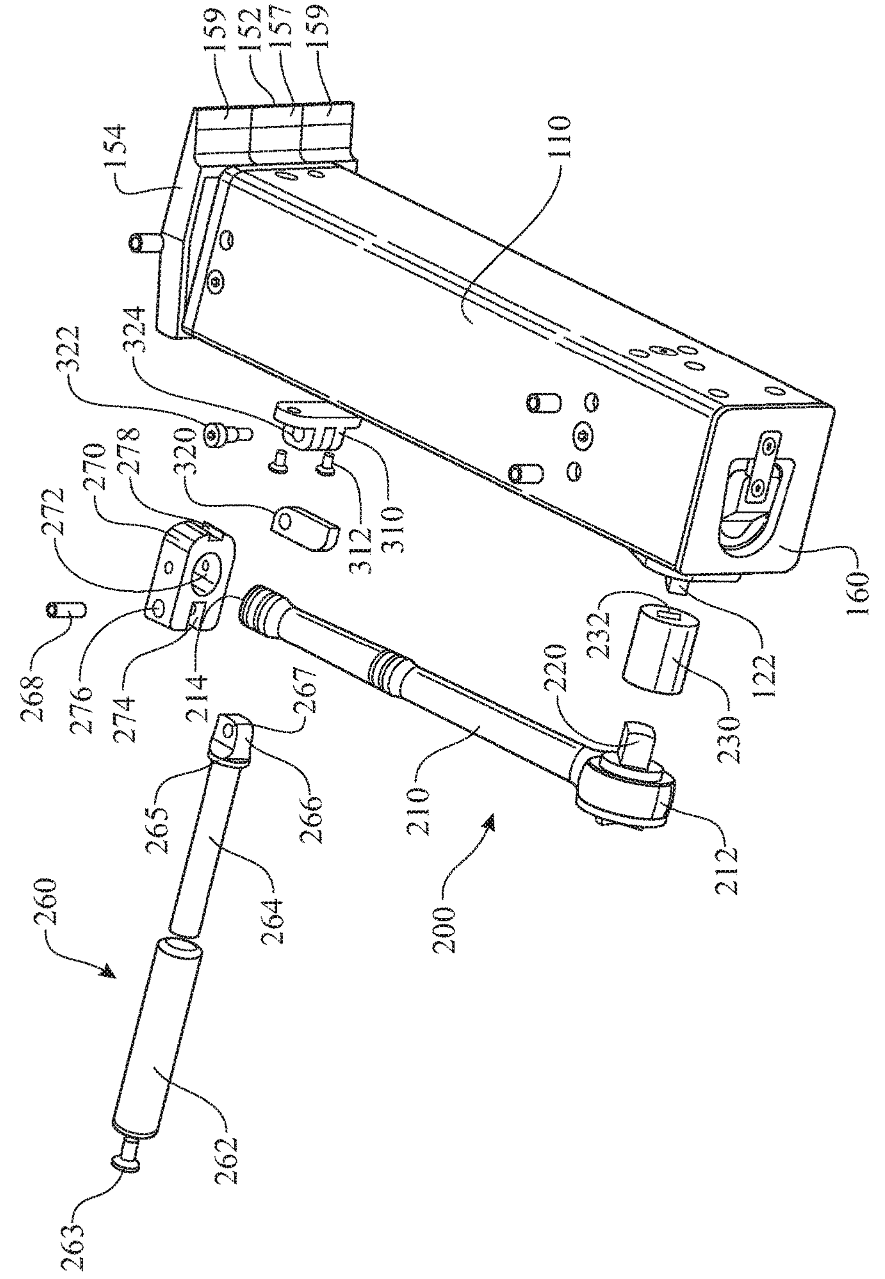
FIG. 13 presents an isometric exploded partially assembly view of the handheld forcible entry device originally introduced in FIG. 1, detailing components of a mechanical torque applicator subassembly and a respective locking subassembly.
Figure 14:
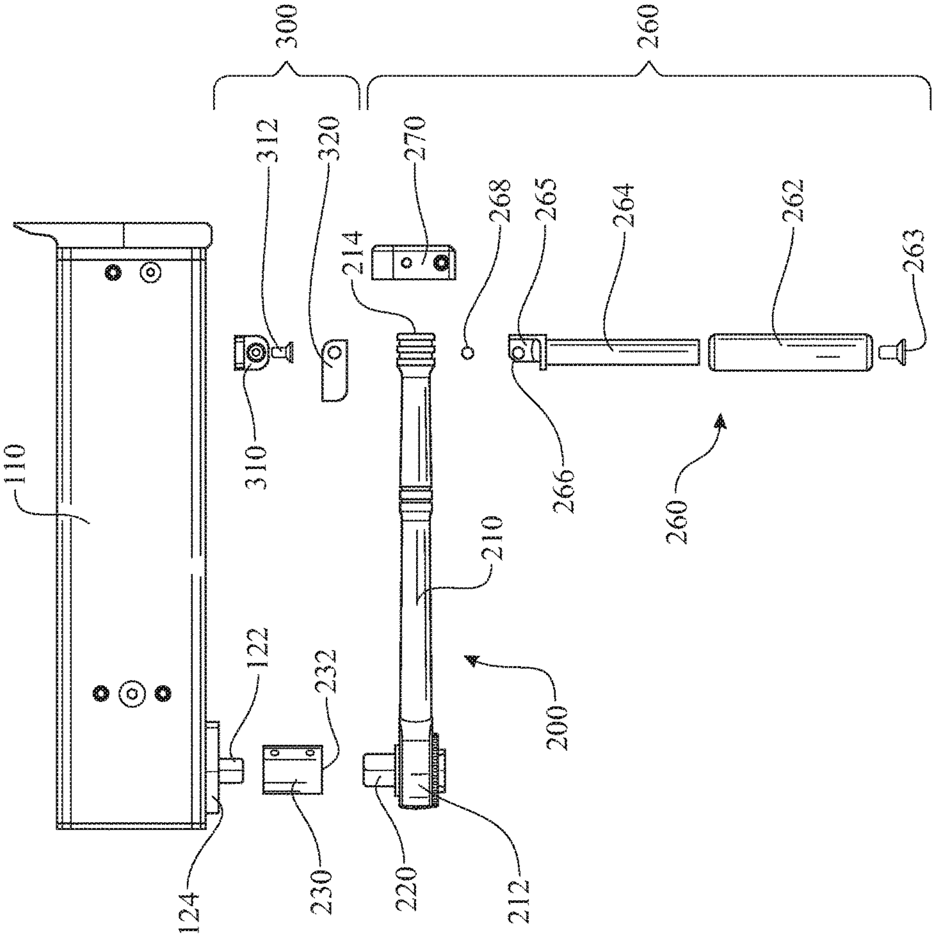
FIG. 14 presents a side elevation partially exploded assembly view of the handheld forcible entry device originally introduced in FIG. 1, detailing components of a mechanical torque applicator subassembly and a respective locking subassembly.
Figure 15:
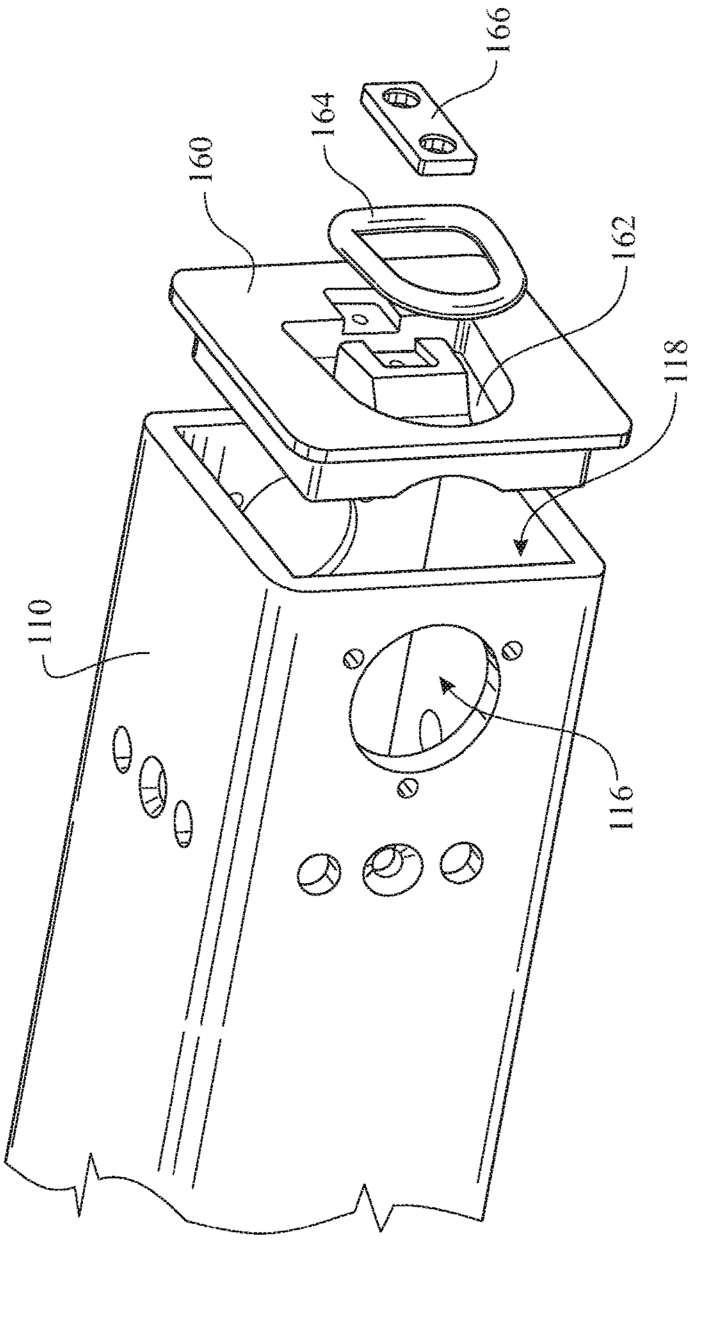
FIG. 15 presents an isometric exploded partially assembly view of a cover region of the handheld forcible entry device originally introduced in FIG. 1, detailing components of a lifting ring pivotally assembled to a cover.

The tubular housing 110 is manufactured of a tubular section of rigid material, such as a tubular 3"×3" square section having a predetermined length. The raw material used for the tubular housing 110 can be fabricated of any suitable material including aluminum, plastic, steel, composites, and the like using any suitable process, including an extrusion process, a molding process, and the like. As shown in FIG. 6, orientation of the tubular housing 110 can be referenced by a first sidewall 112 and an opposite, second sidewall 114 of the tubular housing 110. An interior 115 (FIG. 17) of the tubular housing 110 is delimited by the interior surface of the sidewalls 112, 114, and the like. The tubular housing 110 is cut to a length extending between a capped, proximal end 118 and an operational, distal end 119 of the tubular housing 110, shown in FIGS. 8 and 9. With continued reference to FIGS. 8 and 9, the tubular housing 110 is subsequently machined to form an opening or port 116 through the first sidewall 112 of the tubular housing 110 at a location proximate the proximal end 118 of the tubular housing 110. A series of countersunk or counter bored holes for insertion of mechanical fasteners such as threaded screws, bolts, rivets, and the like are formed through the sidewalls of the tubular housing 110 in locations respective for assembly of various components thereto. The fixed wedge plate 150 is affixed to the distal end 119 of the tubular housing 110 by inserting mechanical fasteners through holes 192 located through the sidewall of the tubular housing 110 and engage with mating formations provided within the fixed wedge plate 150. In the exemplary embodiment, the fastener mating formations are provided through a side surface of an axially oriented seat of the fixed wedge plate 150. A cover 160 is affixed to the opposite, proximal end 118 of the tubular housing 110 by inserting mechanical fasteners through holes located through the sidewall of the tubular housing 110 and engage with mating formations provided within the cover 160. In the exemplary embodiment, the fastener mating formations are provided through a side surface of an axially oriented seat of the cover 160. A lifting ring 164 is pivotally assembled to the cover 160 using a lifting ring retention member 166 and respective mechanical fasteners (not shown). It is understood that the lifting ring 164 can be any suitable design and material and assembled to the cover 160 or tubular housing 110 using any reasonable attachment interface known by those skilled in the art, wherein the attachment interface would be based upon the elected form factor of the lifting ring 164. As best shown in FIG. 7, a recess 162 is formed within the cover 160 of the tubular housing 110 for receiving and stowing the lifting ring 164 when not in use.

Figure 17:
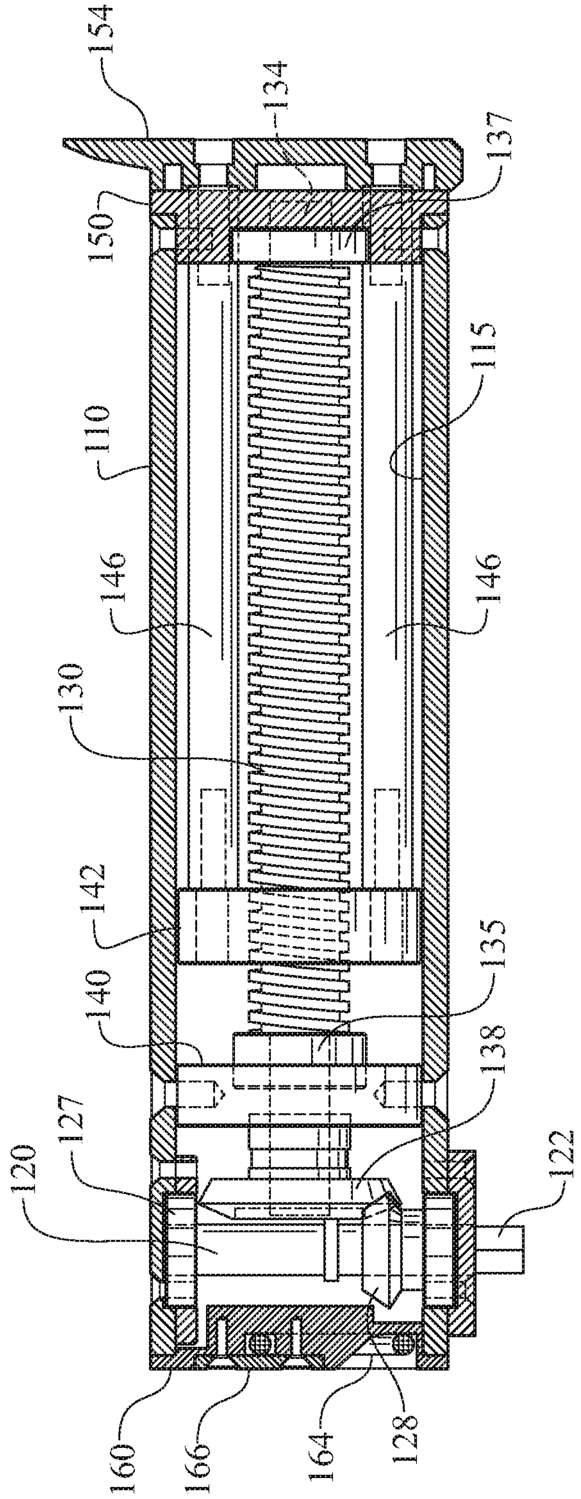
FIG. 17 presents a longitudinal side sectional view of the handheld forcible entry device originally introduced in FIG. 1.

Details of the torque-input drive shaft subassembly are presented in FIGS. 6 through 12 and best shown in an assembled configuration in the cross-sectional view of FIG. 17. The torque-input drive shaft subassembly comprises gear assembly 128, 138 including a first bevel gear 128 rotationally engaged with a second bevel gear 138. The first bevel gear 128 is assembled to a torque-input drive shaft 120. The torque-input drive shaft 120 is rotatable about an "X" axis. Rotation of the torque-input drive shaft 120 drives the first bevel gear 128 to rotate. The torque-input drive shaft 120 is rotationally assembled to the tubular housing 110 by a pair of bearings consisting of a torque bearing 125 and a retention bearing 127. The torque bearing 125 is affixed to the tubular housing 110 by a support or first cover plate 124, which also supports the torque-input drive shaft 120 and is assembled to an exterior surface of the first sidewall 112 of the tubular housing 110 by a series of mechanical fasteners, such as the fastener 196 illustrated in FIG. 2. The torque bearing 125 is seated within a cavity within the first cover plate 124. Similarly, the retention bearing 127 is affixed to the tubular housing 110 by a second cover plate 126, which is assembled to an interior surface of the second sidewall 114 of the tubular housing 110 by a series of mechanical fasteners, similar to the fastener 196 illustrated in FIG. 2. The first bevel gear 128 includes a beveled gear section concentrically formed about a central bore passing therethrough. The first bevel gear 128 is affixed to a central region of the torque-input drive shaft 120. The first bevel gear 128 is assembled to the torque-input drive shaft 120 in a manner wherein the two components 120, 128 rotate in unison. The torque-input drive shaft 120 can include any known feature to retain the torque-input drive shaft 120 from any undesirable axial motion.

Details of the pressure applicating lead screw subassembly are presented in FIGS. 6 through 12 and best shown in an assembled configuration in the cross-sectional view illustrated in FIG. 17. The pressure applicating lead screw subassembly comprises a central helical lead screw 130 assembled to the second bevel gear 138 of torque-input drive shaft subassembly, and more specifically to a gear connecting portion 139 of the second bevel gear 138. The lead screw 130 is rotatable about a longitudinal "Y" axis, wherein the "Y" axis is generally perpendicular to the transverse "X" axis. Rotation of the second bevel gear 138 (driven by the first bevel gear 128) causes the central helical lead screw 130 to rotate. The lead screw 130 includes a proximal end 132 extending concentrically and axially from a central, threaded portion 133 of the lead screw 130 and a distal end 134 at an opposite end of the lead screw 130. The central, threaded portion 133 of the lead screw 130 includes a helical screw for engagement with a central aperture 141 of a movable platform 142. The helical screw is designed and shaped having non-stranded tooth lines as well as variations of cross-sectional profiles, which project from an actual three-dimensional shape of the gear teeth. The cross-sectional shape of the teeth, along with the specific angular gear pitch of both the cross-sectional profile and specific tool line (curve) creates a unique smoothness of operation of the gears, with less wear and breakage. The design of the helical teeth and respective threaded aperture 143 is a major factor in the creation of a smoother, stronger and more efficient gear action. Moreover, the lead screw 130 is designed having innovative variations from several known lead screws that fall under ISO standards. The lead screw 130 preferably incorporates a right hand clockwise operational rotation, a new thread angle developed with a new pitch. The angle and non-ISO standard trapezoidal thread form developed is manufactured by single point form tool method. Thus, the screw can carry much greater loads than similar looking units, as well as reducing wear on the mating threaded aperture 143. Additionally, internal thread diameters have been adjusted for both male and female components to a non-standard design to decrease weight, while maintaining substantial strength.

Figure 16:
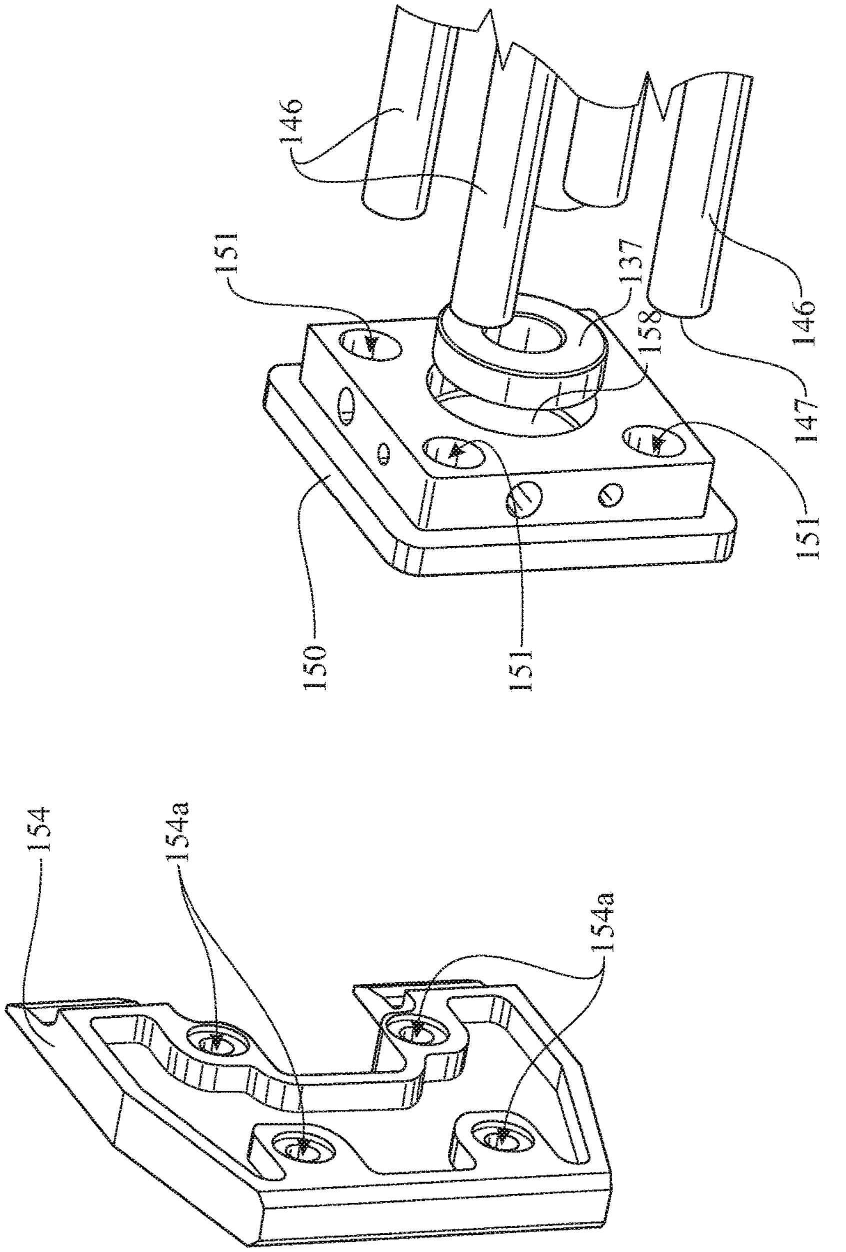
FIG. 16 presents an isometric exploded partially assembly view of a movable wedge plate and a portion of the respective operating components thereof.

The lead screw 130 is rotationally assembled to the tubular housing 110 by a stationary thrust platform 140 and the fixed wedge plate 150, which are non-movably attached to the tubular housing 110 and respectively carry a proximal end bearing 135 and a distal end bearing 137, which in turn rotationally carry the lead screw 130. The proximal end 132 of the lead screw 130 is inserted through an interior seating surface of the proximal end bearing 135. The proximal end bearing 135 is seated within a receiving cavity 145 formed within the stationary thrust platform 140. The stationary thrust platform 140 is inserted into an interior section of the tubular housing 110 and affixed to the housing 110 by a series of mechanical fasteners, similar to the fastener 196 previously described. The fasteners (not illustrated) are inserted through a series of apertures 190 formed through the sidewalls of the tubular housing 110, wherein the apertures 190 are best shown in FIG. 6. The distal end 134 of the lead screw 130, at the opposite end of the lead screw 130, is inserted through an interior seating surface of a distal end bearing 137. The distal end bearing 137 is seated within a receiving cavity 158 formed within the fixed wedge plate 150 as best illustrated in FIGS. 7 and 16.

The second bevel gear 138 includes a beveled gear section concentrically formed about a central bore passing therethrough. The second bevel gear 138 is affixed to the proximal end 132 of the lead screw 130. The second bevel gear 138 is assembled to the lead screw 130 in a manner wherein the two components 130, 138 rotate in unison. The lead screw 130 is restrained from any undesirable axial motion and allowed to rotate relative to the housing 110 by the proximal and distal end bearings 135, 137.

The pressure generating subassembly further comprises a plurality of columns 146 extending from the movable platform 142 to the movable wedge plate 154. A proximal end 149 of each column 146 is inserted into and affixed within a column receiving countersink 148 formed within a respective distally-facing face 144 of the movable platform 142.

Each of the columns 146 is slidably inserted through a respective through bore 151 of the fixed wedge plate 150. Each column 146 slidably moves along a respective "Z" axis, shown in FIG. 6, wherein the "Z" axis is substantially parallel to the "Y" axis. The threaded aperture 143 of the movable platform 142 threadably engages with the helical section or threaded body 133 of the lead screw 130. The movable wedge plate 154 is integrated into the pressure generating subassembly by securing the movable wedge plate 154 to distal ends 147 of the columns 146. The movable wedge plate 154 can be assembled to the distal ends 147 using any known suitable assembly technique, such as mechanical fasteners, adhesives, welding, press fit assembly, and the like. In the exemplary embodiment, threaded fasteners are inserted through mounting apertures 154*a* formed in the movable wedge plate 154 and are threadably engaged with a threaded bore formed within the distal ends 147 of the columns. The mounting apertures 154*a* are preferably formed with a countersunk or counterbore recessing (dependent upon the style of the screw head) for receiving a head of the mechanical threaded fastener.

The movable wedge plate 154 further includes a space or clearance 156 that provides a clearance for the foot 152 of the fixed wedge plate 150, enabling the foot 152 of the fixed wedge plate 150 to nest within the clearance 156 of the movable wedge plate 154. As shown in FIG. 1, when the foot 152 of the fixed wedge plate 150 is nested within the clearance 156 of the movable wedge plate 154, a distal, exposed surface 153 of the foot 152 is coplanar with a distal, exposed surface 155 of the movable wedge plate 154. An operating edge 157 of the foot 152 of fixed wedge plate 152 and an operating edge 159 of the movable wedge plate 154 are formed having a taper for ease of insertion between two closely placed objects, such as a door and a door jam, a window and a window frame, and the like.

In operation, the torque-input drive shaft 120 is rotated by either a manual input or a powered input. The rotational motion of the torque-input drive shaft 120 simultaneously rotates the first bevel gear 128. As mentioned heretofore, the first bevel gear 128 is assembled engaging with the second bevel gear 138, wherein when the first bevel gear 128 is rotated, the rotational motion of the first bevel gear 128 rotationally drives the second bevel gear 138, and subsequently simultaneously rotates the lead screw 130. The rotation of the threaded body 133 of the lead screw 130 engages with the threaded aperture 143 of the movable platform 142. Because the lead screw 130 is rotatable, yet longitudinally non-movable, and the movable platform 142 is rotationally fixed while longitudinally movable, rotation of the lead screw 130 drives the movable platform 142 to move in either axial direction along the lead screw 130, depending upon the rotational direction applied to the torque-input drive shaft 120. Rotation of the torque-input drive shaft 120 in a first direction drives the movable platform 142 towards the fixed wedge plate 150; rotation of the torque-input drive shaft 120 in an opposite, second direction drives the movable platform 142 towards the stationary thrust platform 140. The motion of the movable platform 142 is translated to the movable wedge plate 154 through the series of columns 146. In one direction, the movable wedge plate 154 is driven distally from the foot 152, causing the movable wedge plate 154 to separate distally from the fixed wedge plate 152, thus employing a forcibly entry into an object, structure, and the like.

Rotation of the torque-input drive shaft 120 can be applied by either a manual input, as illustrated by the forcible entry device 100, or by a powered input, as illustrated by a powered handheld forcible entry device 400, shown in FIGS. 18-24. The following describes the manual input embodiment, as illustrated by the exemplary forcible entry device 100 shown in FIGS. 1 through 17. As mentioned heretofore, a torque application end 122 is formed at an input end of the torque-input drive shaft 120. The torque application end 122 is shaped to torsionally engage with a mechanical drive input device, such as an exemplary operational drive ratchet 200 shown in FIG. 1.

The operational drive ratchet 200 includes a ratchet operational end 212 located at an operational end of a ratchet 210. The ratchet operational end 212 includes elements commonly known with a drive ratchet, including a ratchet gear and a respective pawl assembled within a cavity formed within the operational end of a ratchet 210. The ratchet 210 can be manufactured of chrome-vanadium steel or any other suitable material.

A faceted ratchet drive projection 220 is in operational engagement with the toothed drive gear to rotate in accordance with a first rotational motion of the ratchet 210 and retaining in position when the ratchet 210 is rotated in an opposite rotational direction. The faceted ratchet drive projection 220 extends outward from a face of the ratchet operational end 212 enabling engagement with a drive tool. In the instant invention, a drive element adapter 230 is provided as a drive tool, torsionally engaging the ratchet operational end 212 and the torque application end 122 with one another via a complimentary drive adaptive cavity 232. The complimentary drive adaptive cavity 232 can be provided as a bore passing concentrically through the drive element adapter 230 or as individual cavities extending concentrically inward from each end of the drive element adapter 230. As shown in the exemplary embodiment in FIGS. 13 and 14, the complimentary drive adaptive cavity 232 is a bore passing through the drive element adapter 230, wherein the faceted ratchet drive projection 220 is inserted into a complimentary drive adaptive cavity 232 and the torque application end 122 is inserted into the opposite end of the complimentary drive adaptive cavity 232.

Due to the nature of the orientation and arrangement of the ratchet 210 respective to the adjacent sidewall of the tubular housing 110, the close proximity can be cumbersome for use. To compensate and provide additional support to the user, an extension handle assembly 260 can be adapted to a ratchet grip free end 214 of the ratchet 210, as illustrated in FIGS. 1-5, 13, and 14. The exemplary extension handle assembly 260 includes a pivotal handgrip shaft 264, which is pivotally assembled to the ratchet grip free end 214 of the ratchet 210 by an extension handgrip adaptor 270. The ratchet grip free end is seated and affixed within a ratchet receiving counterbore 272 of the extension handgrip adaptor 270. An optional rotational external handgrip 262 can be rotationally and/or telescopically assembled to a distal end of the pivotal handgrip shaft 264. The design of the rotational external handgrip 262 and respective portion of the pivotal handgrip shaft 264 can be as described herein or of any known and suitable design. In the exemplary embodiment, the rotational external handgrip 262 is assembled to the pivotal handgrip shaft 264 by a handgrip fastener 263, thus enabling a rotational motion of the rotational external handgrip 262 about a circumference of the pivotal handgrip shaft 264.

The rotational external handgrip 262 can telescope along the pivotal handgrip shaft 264, increasing a length of the handle to from approximately 8" in length (retracted) to approximately 12" in length (extended), thus increasing the torque range by a factor of 10.

An adaptor hinge formation 274 is formed extending inward from an edge of the extension handgrip adaptor 270. A mating handgrip shaft pivot assembly hinge formation 266 is formed at a handgrip shaft assembly end 265 of the pivotal handgrip shaft 264. The handgrip shaft pivot assembly hinge formation 266 is inserted into the adaptor hinge formation 274. A pivot pin 268 is preferably press fit through a pivot pin assembly bore 276 extending through the extension handgrip adaptor 270, wherein the pivot pin assembly bore 276 is oriented generally perpendicular to a plane defined by the adaptor hinge formation 274. The pivot pin 268 passes through a handgrip shaft pivot assembly bore 267 extending through the handgrip shaft pivot assembly hinge formation 266 of the pivotal handgrip shaft 264. The pivot pin 268 forms a pivotal interface between the pivotal handgrip shaft 264 and the extension handgrip adaptor 270. The pivotal interface enables translation of the extension handle 260 from a configuration where the extension handle 260 is parallel to the ratchet 210 and a configuration where the extension handle 260 is perpendicular to the ratchet 210. The extension handle 260 can include a spring-loaded ball lock to disengageably lock the extension handle 260 at a 90° angle and or a 180° angle to the ratchet 210. The inclusion of the extension handle 260 increases the speed of opening doors as an operator can spin and crank the handle five times faster than using the ratchet all self-contained in a versatile unique handle.

An optional lock assembly 300 can be integrated into the forcible entry device 100 to retain the operational drive ratchet 200 in a stored configuration when the forcible entry device 100 is not in use. The lock assembly 300 includes a lock assembly hinge 310, which is affixed to an external surface of the tubular housing 110 by one or more hinge fasteners 312. A pivotal locking arm 320 is pivotally assembled to the lock assembly hinge 310 by a hinge pin 322. The hinge pin 322 is inserted through a locking arm pivot pin receiving bore 324 of the lock assembly hinge, a similar bore formed through the pivotal locking arm 320 and continuing through a second locking arm pivot pin receiving bore 324. The pivotal locking arm 320 rotates between a ratchet retaining configuration and an operational configuration. A distal edge of the pivotal locking arm 320 is temporarily seated within a locking engaging recess 278 (FIG. 13) extending inward from one side of the extension handgrip adaptor 270, thus restricting any rotational movements of the ratchet 210. For use, the pivotal locking arm 320 is rotated disengaging the edge from the locking engaging recess 278, enabling rotation of the ratchet 210.

In use, a distal end of the pivotal locking arm 320 is rotated away from the locking engaging recess 278, releasing the extension handgrip adaptor 270 from the lock assembly 300, thus enabling rotational motion of the operational drive ratchet 200. The extension handle 260 is rotated outward to a generally perpendicular relation with the operational drive ratchet 200. The user grips the rotational external handgrip 262 of the extension handle 260 and begins to apply a force to thereto, rotating the ratchet 210 in either a clockwise or counterclockwise rotation. The rotational direction would be respective to the desired operation of the movable wedge plate 154. In one direction, the movable wedge plate 154 is advanced or separated from the foot 152. In the opposite direction, the movable wedge plate 154 is retracted or drawn towards the foot 152. The rotational direction is dictated by the arrangement of the bevel gears 128, 138 and the handing or direction of the thread formation of the lead screw 130.

A second exemplary embodiment, referred to as a powered handheld forcible entry device 400, is presented in FIGS. 18 through 24. The operational drive ratchet 200 is a power-operated version of the forcible entry device 100 used to forcibly separate a closure (such as a door, a window, a gate, and the like) and a respective closure frame (such as a door frame, a window frame, a fence, and the like) from one another, thus dislodging the locking mechanism extending between the closure and the respective closure frame. The majority of the components of the powered handheld forcible entry device 400 are similar to those of the forcible entry device 100, wherein like features of the powered handheld forcible entry device 400 and the forcible entry device 100 are numbered the same except preceded by the numeral “4”.

A powered torque is applied to a torque application end 422 of the powered handheld forcible entry device 400 by a powered torque applicator 600 and an intermediary torque converting reduction gear 500. The powered torque applicator 600 can be any powered rotary device, such as a drill, a powered screwdriver, and the like. The powered torque applicator 600 can be electrically powered, pneumatically powered, or any other suitable power source known by those skilled in the art. In the exemplary embodiment, the powered torque applicator 600 contains a drive motor arranged to directly or indirectly rotate a torque applicating engagement element 610. The drive motor and any intermediary components, such as a torque converter, a clutch, and the like are encased within a powered torque applicator housing 602. Power can be provided by a removable portable power supply 604, which is preferably removably attached to the powered torque applicator housing 602. The preferred removable portable power supply 604 is a rechargeable lithium ion battery.

Figure 18:
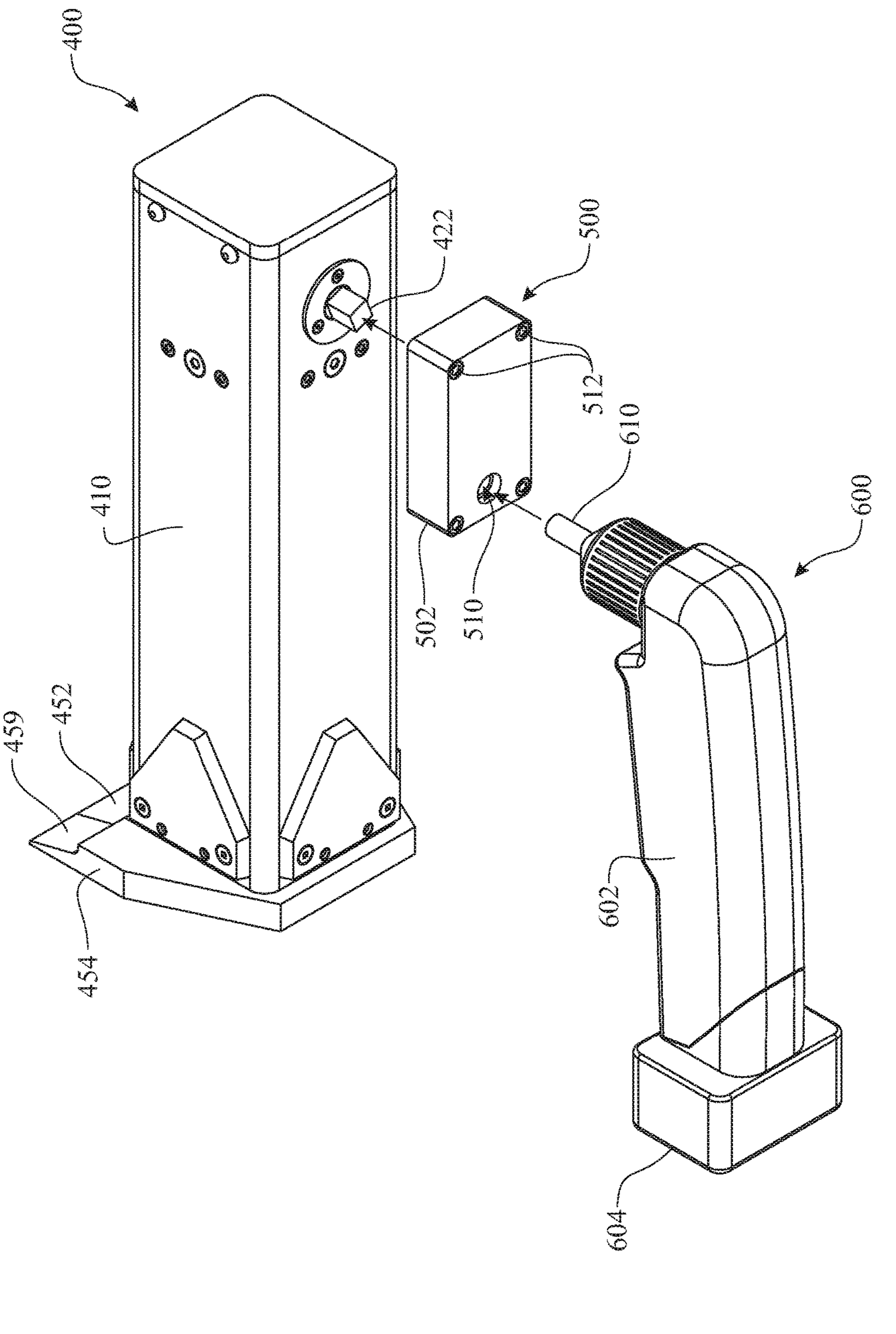
FIG. 18 presents an isometric partially exploded view of a second exemplary handheld forcible entry device in accordance with the present invention, introducing components of an operational powered drive system.
Figure 19:
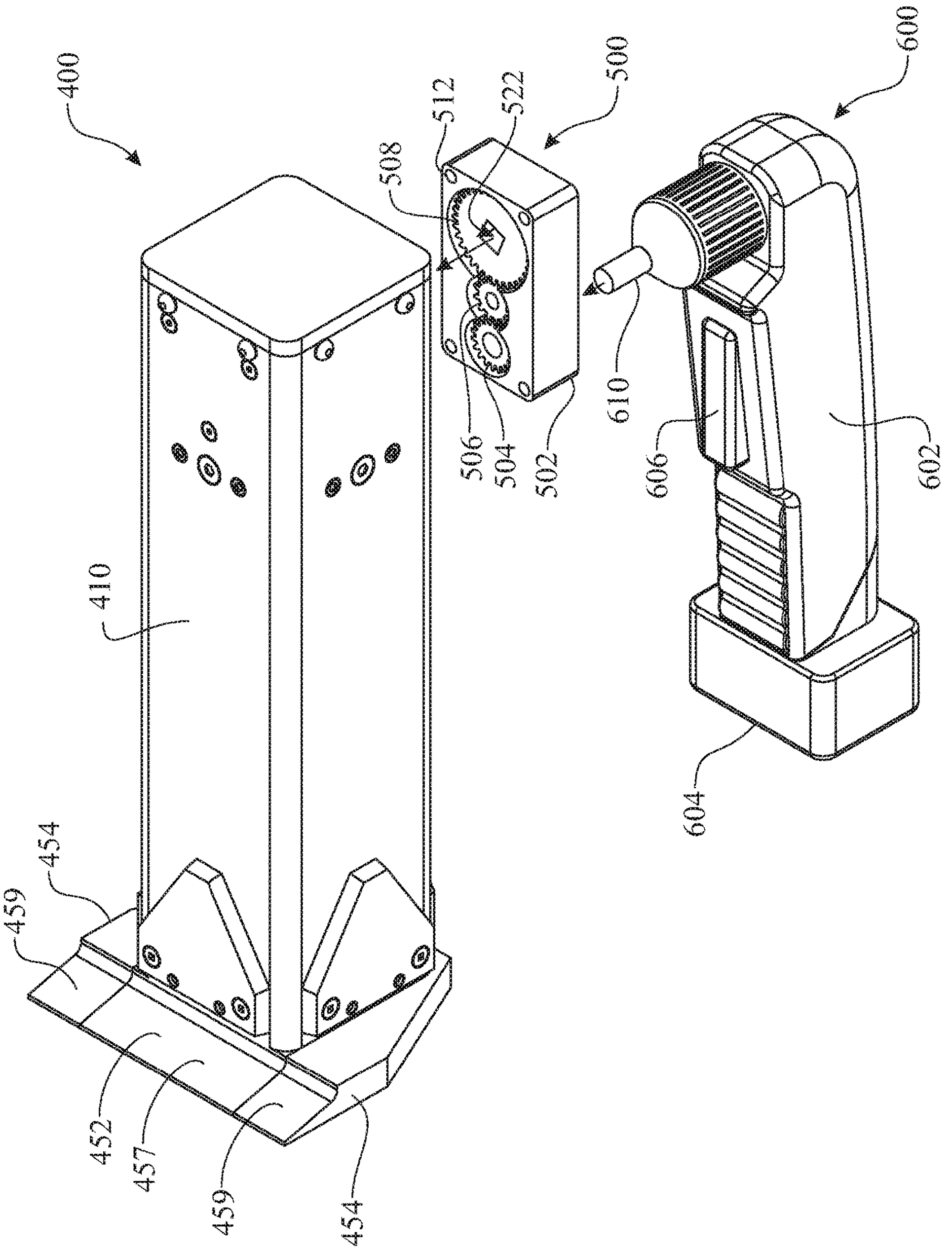
FIG. 19 presents an alternative isometric partially exploded view of the handheld forcible entry device originally introduced in FIG. 18, detailing a torque converter and powered driver of the operational powered drive system.
Figure 20:
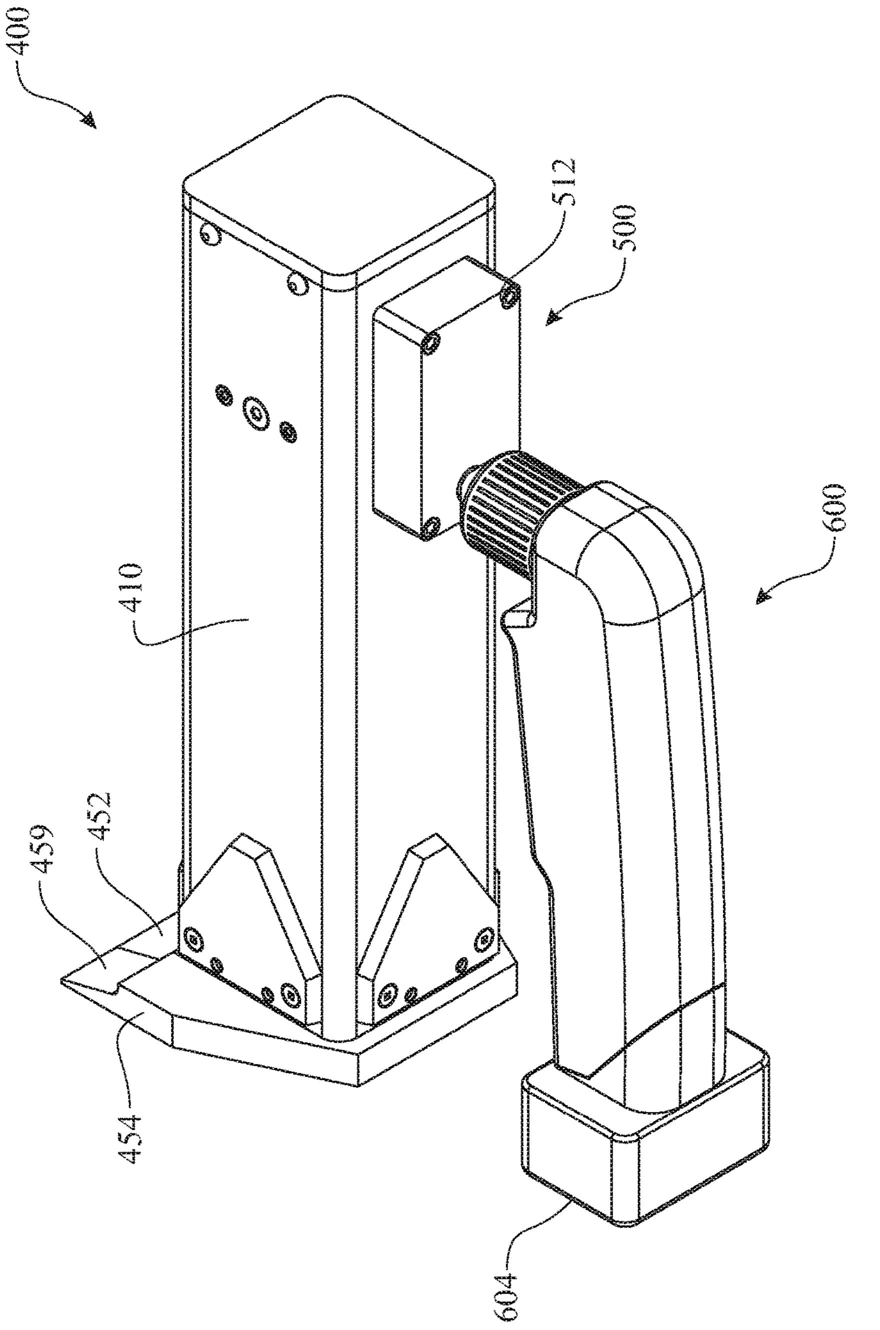
FIG. 20 presents an assembled isometric view of the handheld forcible entry device originally introduced in FIG. 18.

The torque converting reduction gear 500 integrates a series of gears to convert a low torque, high-speed rotation to a high torque, low-speed rotation within a housing 502 of the torque converting reduction gear 500. It is also preferred that the input rotational direction and the output rotation direction are the same. In the exemplary embodiment, as shown in FIG. 19, the torque converting reduction gear 500 comprises a series of three serially engaged gears: an input gear 504, an intermediary gear 506, and an output gear 508. Each gear 504, 506, 508 rotates about a respective central axis. Each gear 504, 506, 508 is rotationally assembled to the housing 502 of the torque converting reduction gear 500 using any suitable rotating retention feature, including a centrally located axle, a bearing, a peripheral edge of a cavity, and the like. As shown in FIG. 18, a torsional input feature 510 is formed in an input side of the input gear 504, wherein the torsional input feature 510 is sized and shaped to torsionally engage with the torque applicating engagement element 610. In a design where the torsional input feature 510 is a bore, the bore would have a non-circular cross section interior shape and the exterior surface of the torque applicating engagement element 610 would have a mating non-circular cross section shape. In a design where the torsional input feature 510 is a shaft, the shaft would have a non-circular exterior cross section shape and the torque applicating engagement element 610 would include a bore have a mating non-circular cross section shape. Similarly, a torsional output feature 522 is formed in an output side of the output gear 508, wherein the torsional output feature 522 is sized and shaped to torsionally engage with the torque application end 422. The torque converting reduction gear 500 is affixed to an external surface of a sidewall of the tubular housing 410.

In operation, the torque applicating engagement element 610 of the powered torque applicator 600 is coupled with the torsional input feature 510. An operational power switch 606 controls power transfer from the removable portable power supply 604 to the motor. The torque applicating engagement element 610 rotates the input gear 504 in a first rotational direction, which rotates the intermediary gear 506 in an opposite, second rotational direction and preferably at a different speed, which in turn rotates the output gear 508 in the first rotational direction and at a reduced rotational speed, while exerting a greater torque. The greater torque is transferred from the torque converting reduction gear 500 to the powered handheld forcible entry device 400 by the coupling between the torsional output feature 522 and the torque application end 422. The rotational energy applied to the torque application end 422 operates the powered handheld forcible entry device 400 as described above in the manner of operation of the forcible entry device 100.

In an exemplary embodiment, the powered handheld forcible entry device 400 is employed to forcibly open a locked locking passageway 700. The exemplary locking passageway 700 includes a lockable door 710 assembled and locked to a doorframe 720. One example of a locking interface includes a dead latch (a moving locking bolt or other locking feature controlled by a key or other operational device), wherein the dead latch is commonly assembled to a lockable door 710 and a strike plate with is commonly assembled to a doorframe 720, wherein an aperture through the strike plate is aligned with a dead latch receiving cavity extending into the respective surface of the doorframe 720. The dead latch receiving cavity is located in registration with the dead latch. When locked, the dead latch is extended from the door edge 712, passing through the strike plate and inserted into the dead latch receiving cavity.

The powered handheld forcible entry device 400 (as well as the forcible entry device 100) can include an optional torsional application handgrip assembly 470. The exemplary torsional application handgrip assembly 470 extends from the cover 460 generally parallel to and preferably concentric with a longitudinal axis of the tubular housing 410. The torsional application handgrip assembly 470 includes a torsional handgrip element 474 assembled to a free, distal end of a torsional handgrip elongated member 472. A proximal, assembly end of the torsional handgrip elongated member 472 is affixed to the cover 460 using any suitable assembly interface. In the exemplary embodiment, the torsional handgrip elongated member 472 is threadably assembled to the cover 460 using a torsional handgrip threaded interface 476. It is understood that the torsional handgrip elongated member 472 can be assembled to the powered handheld forcible entry device 400 at any suitable location and using any suitable fixed or separating interface. The torsional handgrip elongated member 472 would be manufactured using a material suitable for reliably applying a large torsional force to the powered handheld forcible entry device 400. The torsional handgrip element 474 would be manufactured using any suitable material providing sufficient grip and comfort to the user. The torsional application handgrip assembly 470 enables a user to apply a torsional force to the powered handheld forcible entry device 400, thus enhancing the ability to use the powered handheld forcible entry device 400 as a pry to further aid in forcibly opening the locked closure. The longer the torsional handgrip elongated member 472, the greater the applied torque. Although the exemplary embodiment illustrates a torsional handgrip elongated member 472 having a linear shape, it is understood that the torsional handgrip elongated member 472 can be any shape suitable for applying a torque or prying force to the locked closure using the powered handheld forcible entry device 400.

Figure 25:
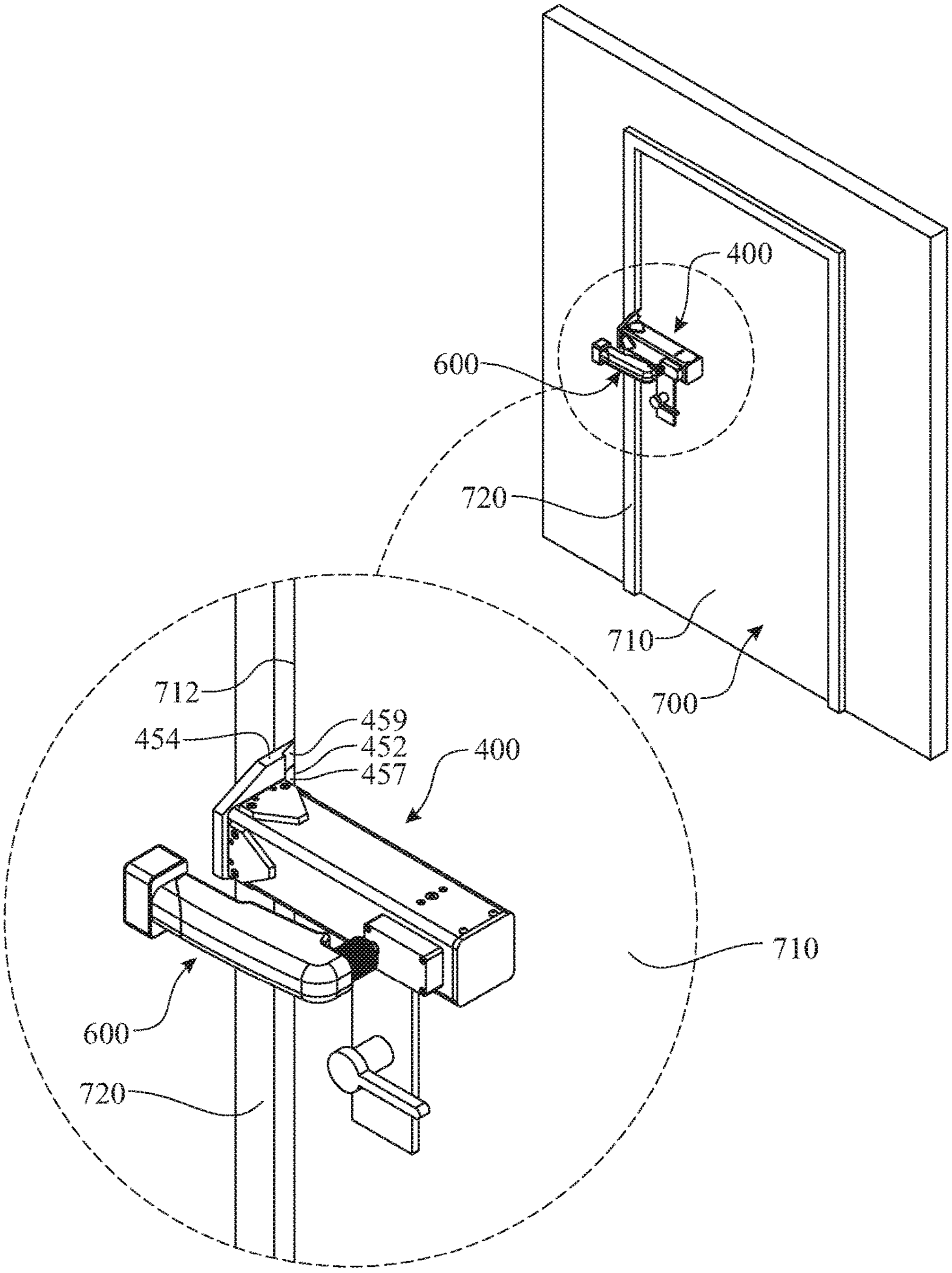
FIG. 25 presents an isometric view of the handheld forcible entry device originally introduced in FIG. 18, shown in operation separating a door from a doorjamb.
Figure 26:
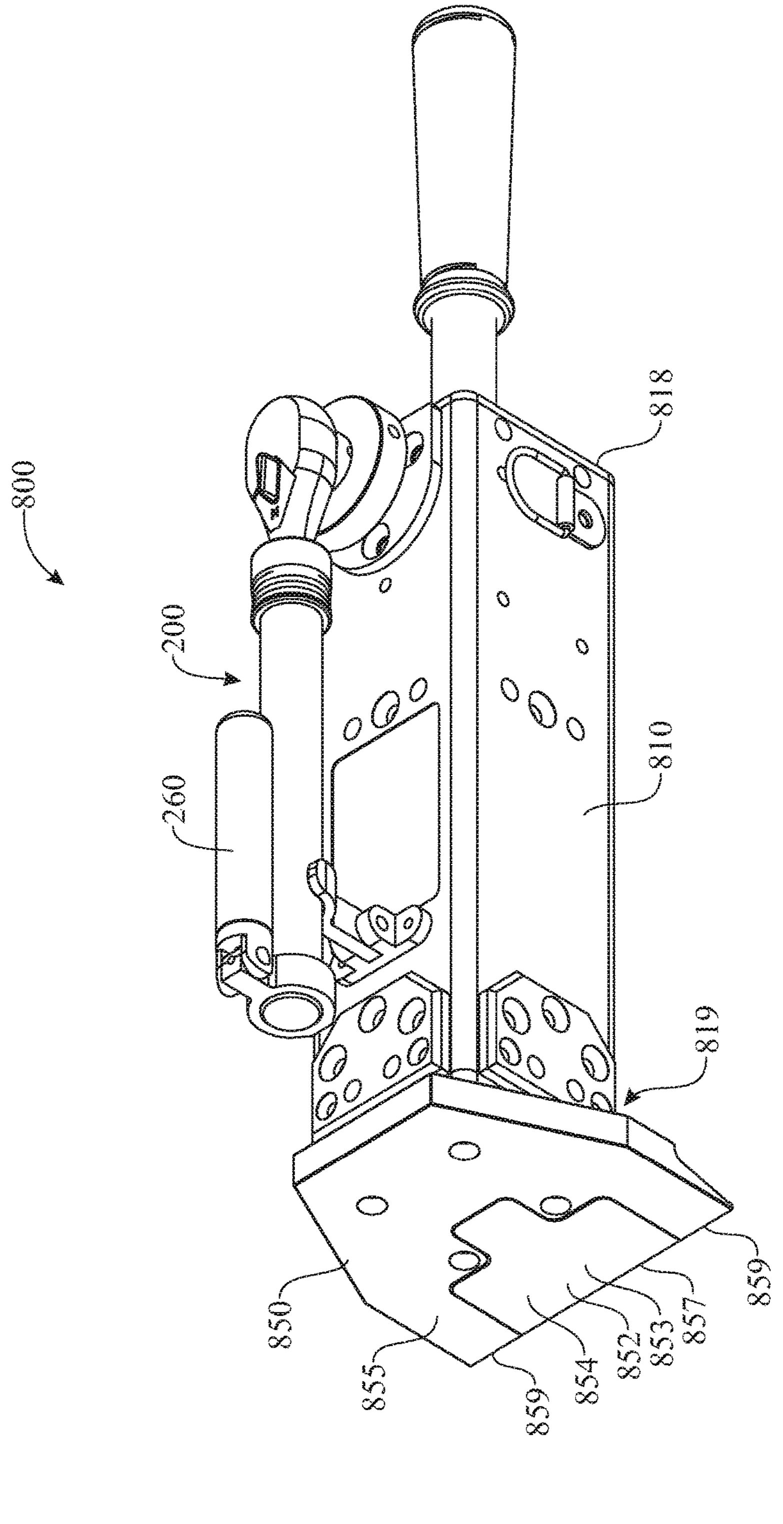
FIG. 26 presents an isometric view of a third exemplary handheld forcible entry device in accordance with the present invention, comprising a 90-degree gearbox.
Figure 27:
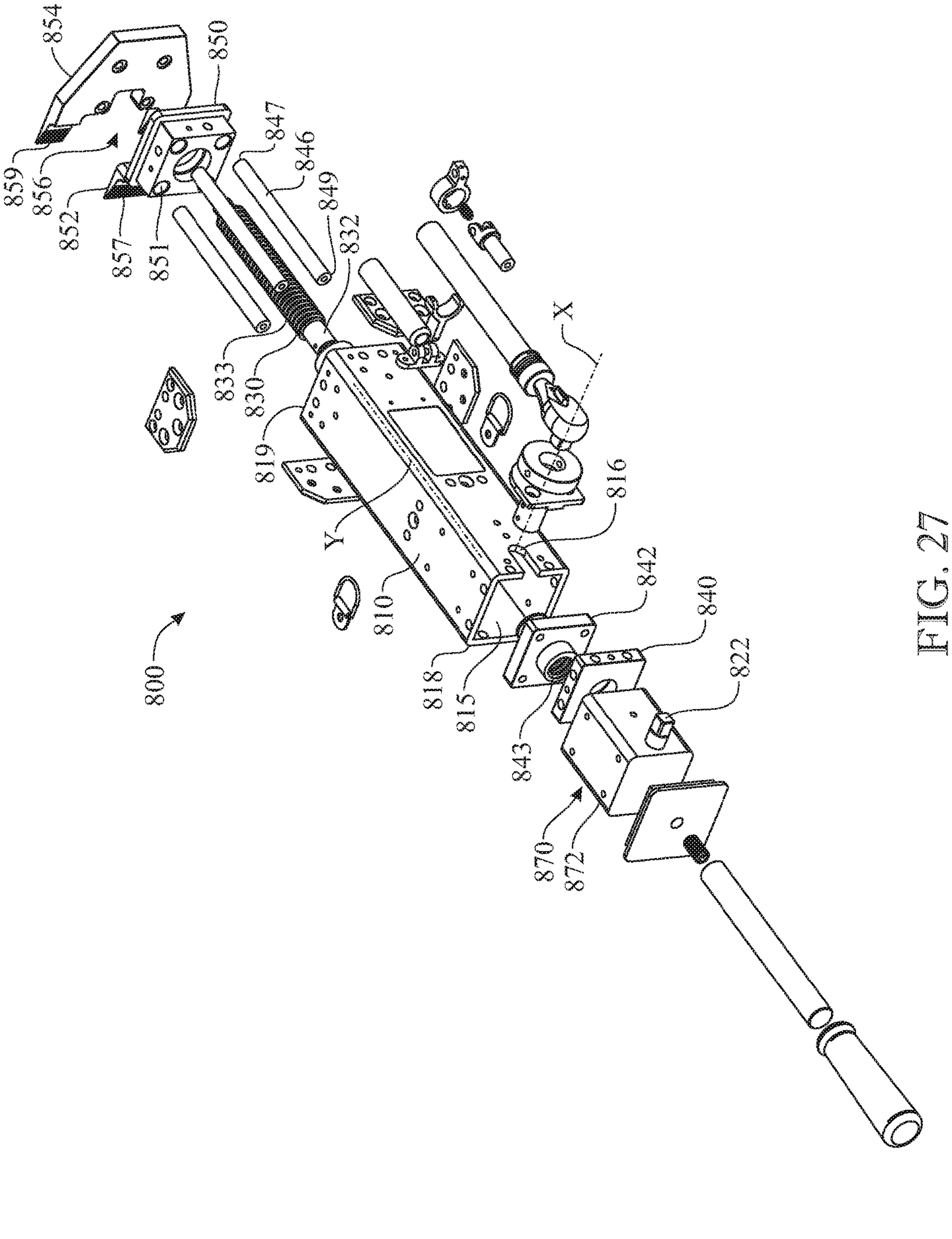
FIG. 27 presents an exploded perspective view of the handheld forcible entry device of FIG. 26.
Figure 28:
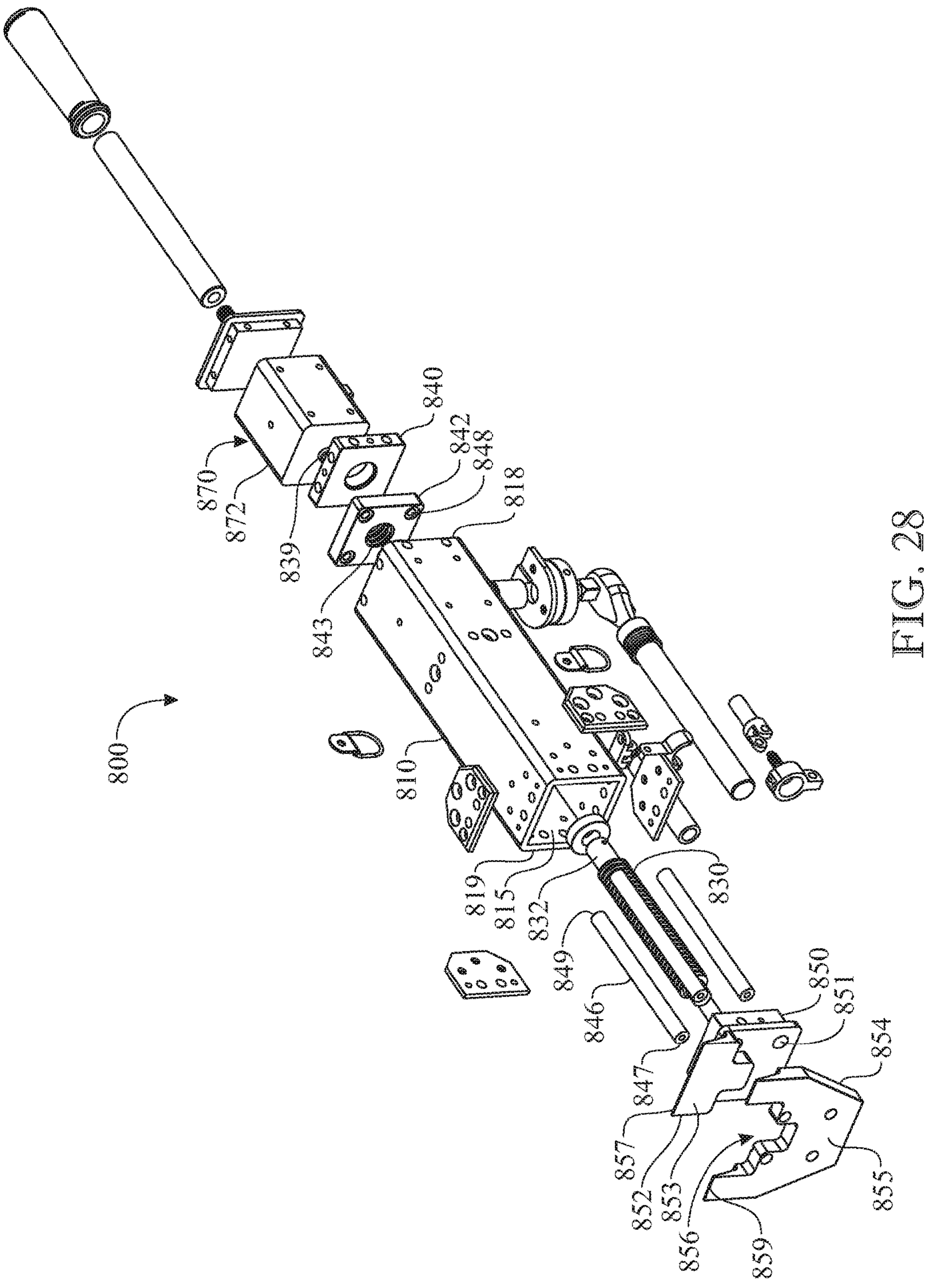
FIG. 28 presents another exploded perspective view of the handheld forcible entry device of FIG. 26, shown from an opposite end.

Details of the powered handheld forcible entry device 400 in practice are presented in FIG. 25. The powered handheld forcible entry device 400 is positioned inserting a wedge end of the fixed wedge plate 450 and pressure applicating, movable wedge plate 454 between the lockable door 710 and the doorframe 720. The torque converting reduction gear 500 is assembled to the tubular housing 410 engaging the torsional output feature 522 and the torque application end 422 with one another. The powered torque applicator 600 is located engaging the torque applicating engagement element 610 and the torsional input feature 510 with one another. The user activates the operational power switch 606, applying power to the powered torque applicator 600, which rotates the torque applicating engagement element 610. The rotational energy provided by the torque applicating engagement element 610 is transferred to the torque converting reduction gear 500, which in turn, transfers the rotational energy to the torque application end 422. The torque application end 422 operates the gear assembly 428, 438, and more specifically rotates the first bevel gear 428, which in turn rotates a second bevel gear 438. The rotational motion of the second bevel gear 438 rotates a central helical pressure applicating lead screw 430 accordingly (via a gear connecting portion 439). The lead screw 430 threadably engages with the movable platform 442. The rotational motion of the lead screw 430 drives the movable platform 442 along an axial motion of the lead screw 430. In a forcibly opening process, the movable platform 442 is driven towards the foot 452. The movable platform 442 transfers the axial motion to the movable wedge plate 454 by a series of columns 446. The resulting motion separates the movable wedge plate 454 and the foot 452. The separation expands a gap extending between a door edge 712 of the doorframe 720 and the opposing face of the doorframe 720. As the gap expands, the separation dislodges the dead latch from the strike plate, enabling the lockable door 710 to be opened.

The exemplary forcible entry device 100, 400 can be manufactured in any suitable size having any suitable stroke provided between the foot 152 and the movable wedge plate 154. The preferred embodiments would be manufactured in two different sizes, a smaller unit having a foot 152 to movable wedge plate 154 stroke extending between zero and three inches, with a larger unit having a foot 152 to movable wedge plate 154 stroke extending between zero and seven inches.

Figure 21:
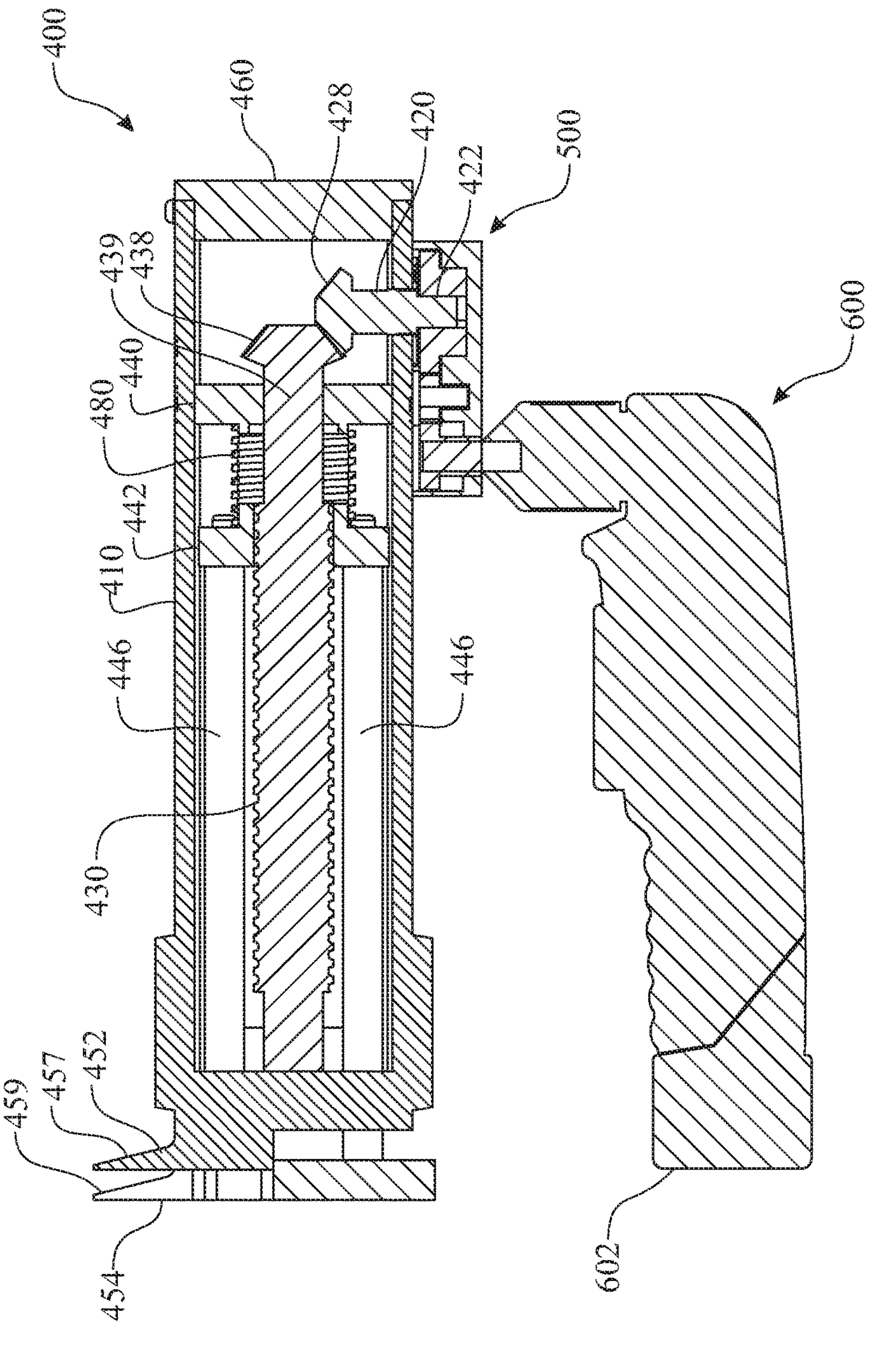
FIG. 21 presents a sectioned side elevation view of the handheld forcible entry device originally introduced in FIG. 18.
Figure 22:
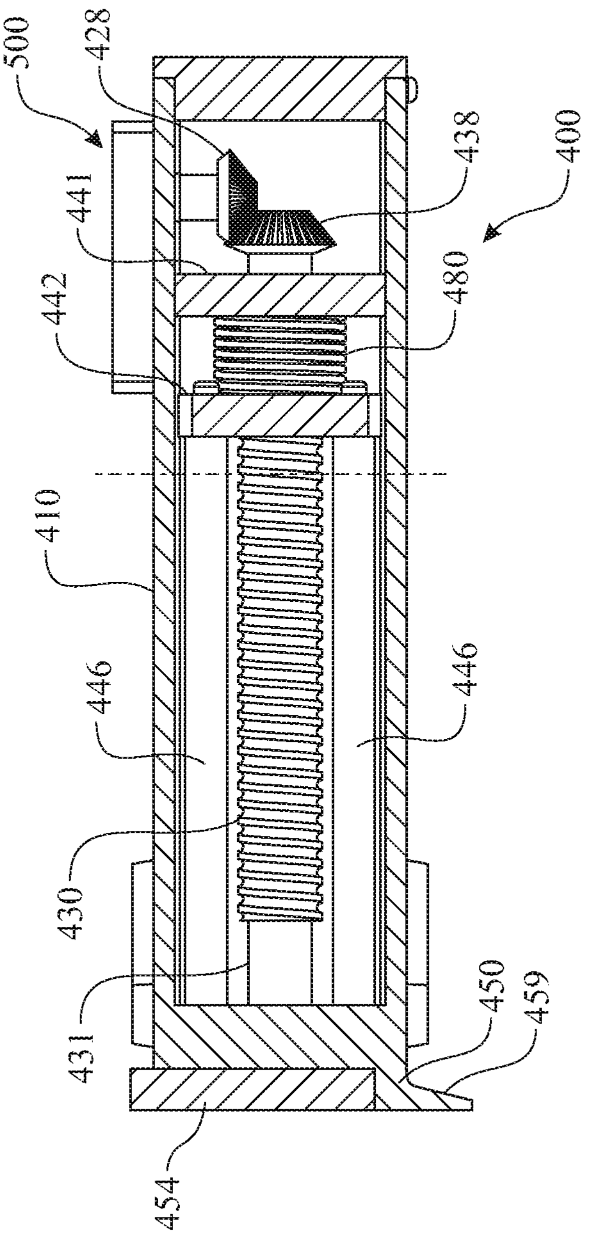
FIG. 22 presents a partially sectioned side elevation view of the handheld forcible entry device originally introduced in FIG. 18, the handheld forcible entry device being shown in a retracted configuration.
Figure 23:
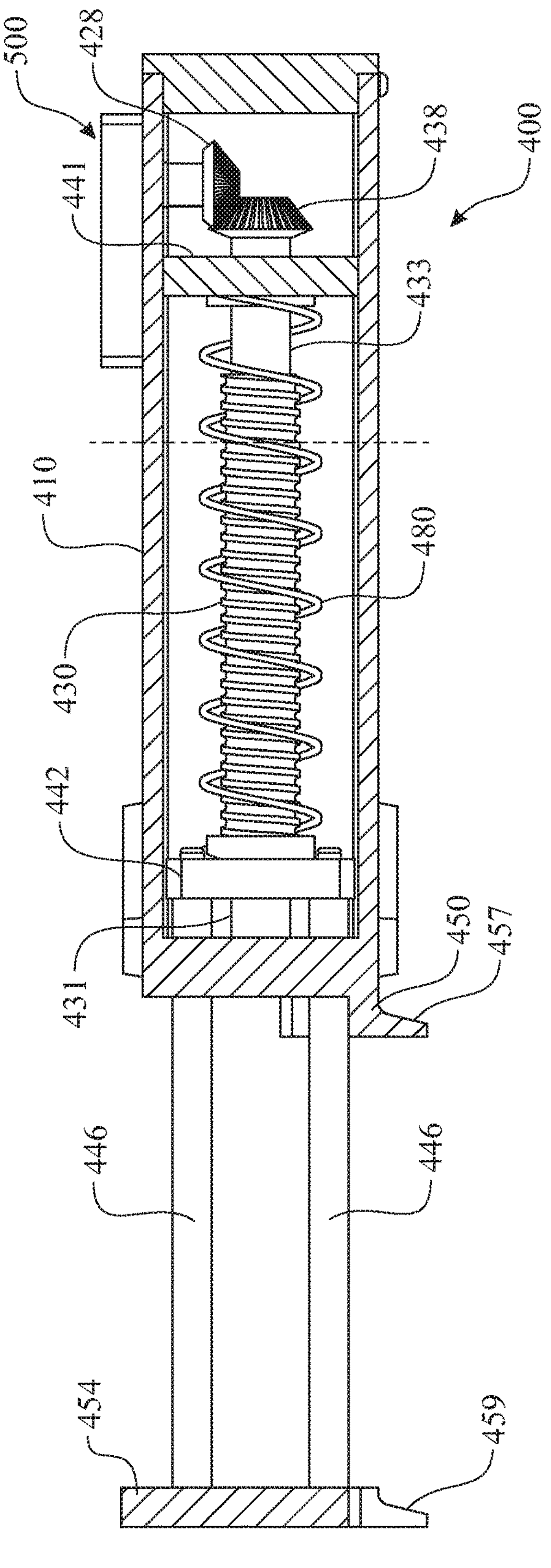
FIG. 23 presents a partially sectioned side elevation view of the handheld forcible entry device originally introduced in FIG. 18, the handheld forcible entry device being shown in an extending operational configuration.
Figure 24:
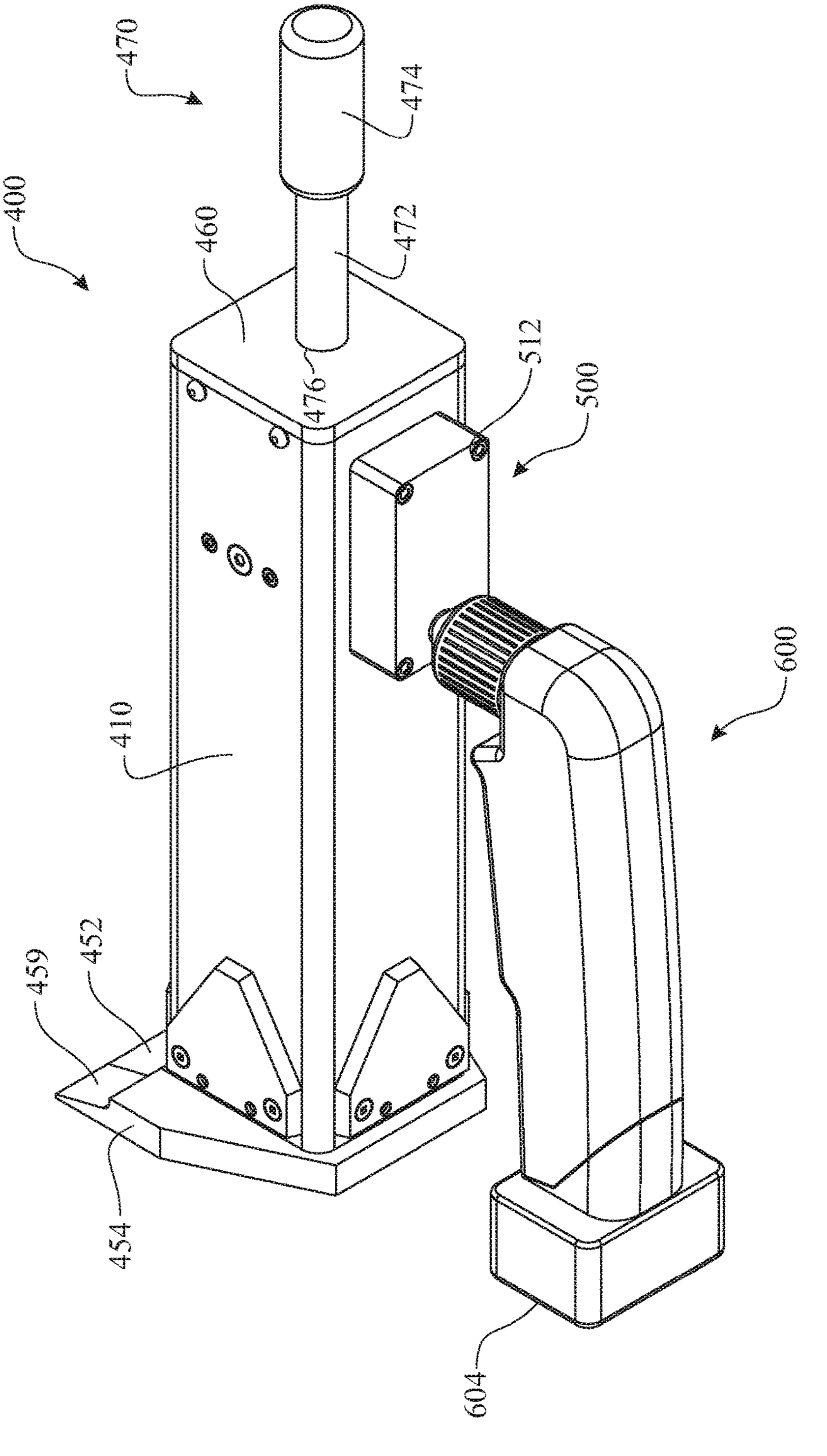
FIG. 24 presents an isometric view of the handheld forcible entry device originally introduced in FIG. 18, further comprising an upper grip to introduce a capability for using the handheld forcible entry device as a pry bar.

An optional pressure applicator control biasing member 480 can be integrated into the handheld forcible entry device 100, 400, as illustrated in FIGS. 21 through 23. The pressure applicator control biasing member 480 can be any suitable biasing member, wherein the exemplary embodiment is a coil spring. The pressure applicator control biasing member 480 can be designed to have a neutral bias when the movable platform 442 is located at a generally central position. The pressure applicator control biasing member 480 would be placed in a compression state, applying an expanding return force to the movable platform 442 when the movable platform 442 is moved towards a proximal end of the handheld forcible entry device 100, 400. The pressure applicator control biasing member 480 would be placed in a tensile state, applying a retracting return force to the movable platform 442 when the movable platform 442 is moved towards a distal end of the handheld forcible entry device 100, 400. The broken traversing line presented in FIGS. 22 and 23 present a position of the movable platform 442 where the pressure applicator control biasing member 480 would be in a normal unbiased state.

Although the exemplary embodiment presented in FIG. 25 utilizes a powered handheld forcible entry device 400, it is understood that the forcible entry device 100 can be employed in the same matter to forcibly open the locking passageway 700.

Although the exemplary locking passageway 700 is directed towards a lockable door 710 and respective door-frame 720, it is understood that the locking passageway 700 can be a window and a respective window frame, a gate and respective fence, and the like.

The illustrations of FIGS. 26-30 show a handheld forcible entry device 800 in accordance with yet another implementation of the invention. Like features of the forcible entry device 800 and the forcible entry device 100 (FIGS. 1-17) are numbered the same except preceded by the numeral '8'.

Figure 29:
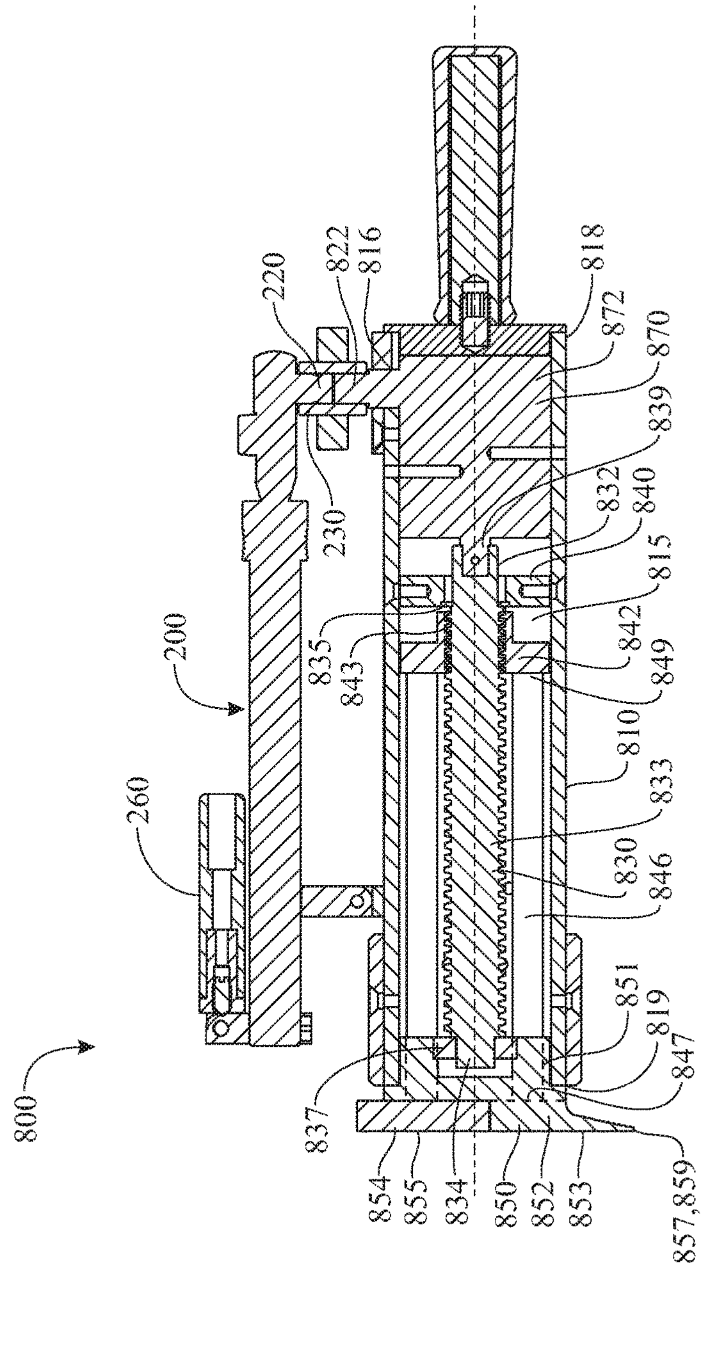
FIG. 29 presents a cross-sectional side elevation view of the handheld forcible entry device of FIG. 26, shown in a compressed state.

Similarly to the previous embodiments, the handheld forcible entry device 800 includes a tubular housing 810 formed extending along a longitudinal axis "Y" (FIG. 29) between a proximal end 818 and a distal end 819 of the tubular housing 810. The housing 810 defines a housing interior 815. Similarly to the embodiment of FIG. 1, a torque application end 822 is provided at an exposed portion of the forcible entry device 800 and protrudes outwardly from the housing 810 through a port 816 formed on a side wall of the housing 810. Also similarly to the embodiment of FIG. 1, the torque application end 822 extends along and is configured to rotate about a torque application axis "X", which is arranged in a transverse direction generally perpendicular to the longitudinal axis "Y" of the tubular housing 810, as best shown in FIG. 29. Similarly to the torque application end 122 of the forcible entry device 100 of FIG. 1, the torque application end 822 is shaped to torsionally engage with a torque applicator, such as an exemplary operational drive ratchet 200 shown in FIGS. 26-30 which is the same as the exemplary operational drive ratchet 200 described heretofore with reference to FIGS. 1-17. However, while the torque application end 122 of the forcible entry device 100 of FIG. 1 is provided by an end of a shaft (the torque-input drive shaft 122), the torque application end 822 of the present embodiment is instead formed as a protruding end of a gear assembly 870 that will be described in greater detail hereinafter.

Similarly to the embodiment of FIGS. 1-17, the forcible entry device 800 further includes a lead screw 830 arranged in the interior 815 of the tubular housing 810. The lead screw 830 is formed about a lead screw axis oriented generally parallel to the longitudinal axis "Y" of the tubular housing 810; in some embodiments, such as the present embodiment, the lead screw axis in fact coincides with the longitudinal axis "Y" of the tubular housing 810. The lead screw 830 includes a threaded body 833 extending between a proximal end 832 and a distal end 834 of the lead screw 830. The lead screw 830 is rotationally assembled to the tubular housing 810 and is rotatable about the lead screw axis. More specifically, a stationary thrust platform 840 is assembled to the tubular housing 810, and the proximal end 832 of the lead screw 830 is rotationally supported by a proximal end bearing 835 carried by the stationary thrust platform 840. In turn, the distal end 834 of the lead screw 830 is rotationally supported by the fixed wedge plate 850, and more particularly by a distal end bearing 837 carried by the fixed wedge plate 850. A movable platform 842 is threadably engaged with the threaded body 833 of the lead screw 830. For this purpose, the movable platform 842 includes a threaded aperture 843 which threadingly receives the threaded body 833 of the lead screw 830.

The gear assembly 870 of the present embodiment comprises a 90-degree gear box 872. The gear box 872 includes a gear connecting portion 839 coupled to the proximal end 832 of the lead screw 830 providing unison rotation of the gear connecting portion 839 and the lead screw 830 about the lead screw axis "Y". The gear assembly 870, and more particularly the 90-degree gear box 872, is configured to convert a rotation of the torque application end 822 about the torque application axis "X" into a rotation of the gear connecting portion 839 of the gear assembly 870 about the lead screw axis "Y".

Similarly to the forcible entry device 100 of the first embodiment, the forcible entry device 800 further includes a fixed wedge plate 850 and a movable wedge plate 854 including respective operating edges 857 and 859. The fixed wedge plate 850 is affixed to the distal end 819 of the tubular housing 810, and includes at least one through bore 851 (four through bores 851 in the present embodiment). In turn, the movable wedge plate 854 is carried by at least one column 846, and more particularly, by four spaced-apart, parallel columns 846. Each column 846 slidably extends through a respective one of the through bores 851 of the fixed wedge plate 850. Each column has a distal end 847 and a proximal end 849. The proximal end 847 and distal end 849 of each column 846 are assembled to the movable platform 842 and the movable wedge plate 854, respectively. Specifically, the proximal end 849 is fitted in a column receiving recess or countersink 848 in the movable platform 842, and the distal end 847 is fitted in a mounting aperture **854*a* formed in the movable wedge plate 854. Fasteners (not shown) can secure the columns 846 to the movable platform 842 and movable wedge plate 854**.

Figure 30:
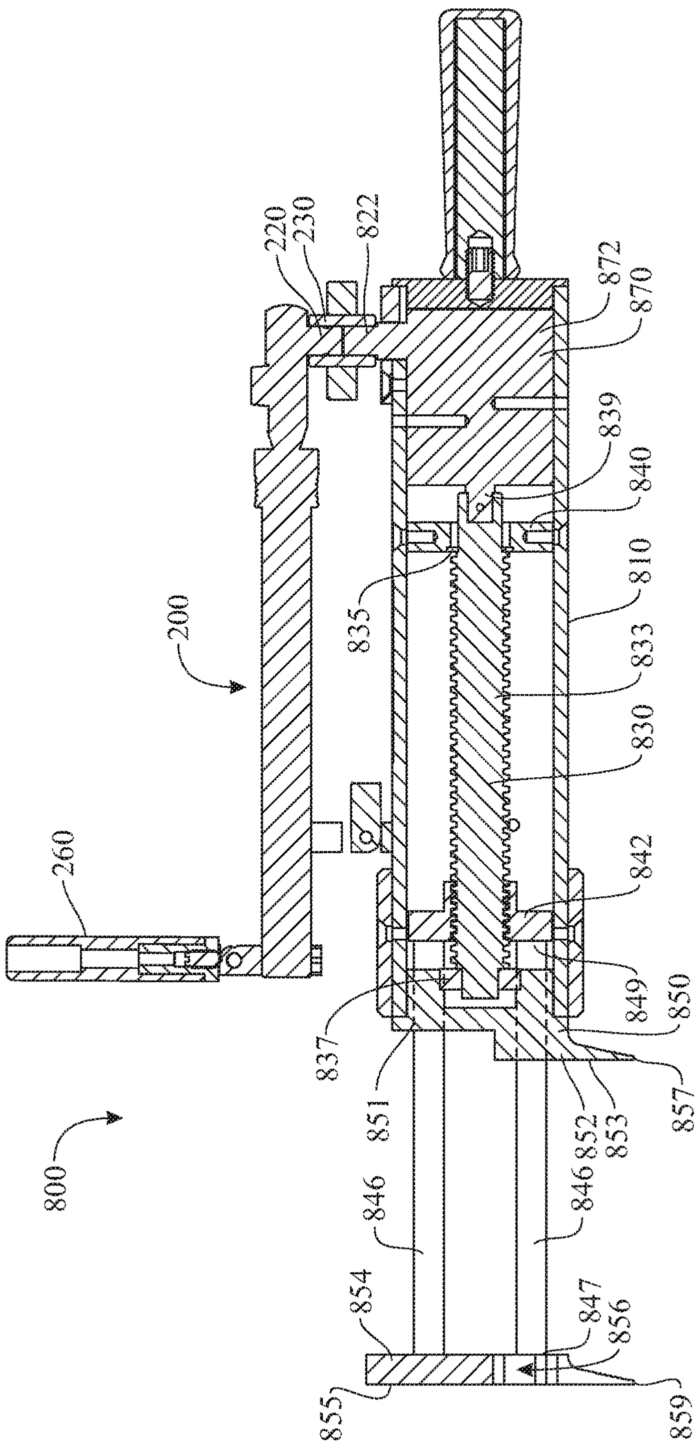
FIG. 30 presents a cross-sectional side elevation view of the handheld forcible entry device of FIG. 26, shown in an expanded state.

Operation of the forcible entry device 800 is illustrated in FIGS. 29 and 30. Initially, the forcible entry device 800 is arranged in a compressed configuration as shown in FIG. 29, in which the movable wedge plate 854 is fitted onto the fixed wedge plate 850 so that a foot 852 of the fixed wedge plate 850 providing the operating edge 857 nests inside a clearance 856 of the movable wedge plate 854. In this initial position, the operating edges 857 and 859 of the fixed and movable wedge plates 850 and 854 are aligned with one another forming a single, linear edge, and respective exposed surfaces 853 and 855 of the fixed and movable wedge plates 850 and 854 are coplanar. In this initial position, a user can easily and swiftly insert the single, linear edge 857, 859 into a gap between a door edge and a door frame (such as the door edge 712 and door frame 720 shown in FIG. 25). Once the operational edge 857, 859 of the forcible entry device 800 is fitted in the gap, the user operates the operational drive ratchet 200 to operate the device. As shown in FIG. 29, the faceted ratchet drive projection 220 of the operational drive ratchet 200 is connected to the torque application end 822 via the drive element adapter 230, torsionally engaging the ratchet operational end 212 of the operational drive ratchet 200 and the torque application end 822 of the forcible entry device 800 with one another so that they become rotatable in unison about transverse axis "X". Then, the user deploys the extension handle assembly 260, and unlocks and turns the operational drive ratchet 200 about the transverse axis "X", thus applying a torque on the faceted ratchet drive projection 220 which is transferred to the torque application end 822, causing the torque application end 822 to rotate. The gear assembly 870 converts the rotation of the torque application end 822 about the transverse axis "X" to a rotation of the gear connecting portion 839 of the gear assembly 870 about the lead screw axis "Y". The gear connecting portion 839 of the gear assembly 870 and the lead screw 830 then rotate in unison about the lead screw axis "Y". Rotation of the lead screw 830 causes a translation of the movable platform 842 in a direction parallel to the lead screw axis "Y". The translation of the movable platform 842 causes a translation of the columns 846 by pushing or pulling the columns 846.

Translation of the columns 846, in turn, moves the movable wedge plate 854 relatively to the fixed wedge plate 850, either towards or away from the fixed wedge plate 850 in dependence of the direction of rotation of the operational drive ratchet 200. Thus, by appropriately rotating the operational drive ratchet 200, the operating edge 859 of the movable wedge plate 854 is separated from the operating edge 857 of the fixed wedge plate 850, causing the door edge 712 and door frame 720 to separate from one another allowing to open the door.

The illustrations of FIGS. 31-35 show a handheld forcible entry device 900 in accordance with yet another implementation of the invention. Like features of the forcible entry device 900 and the forcible entry device 800 (FIGS. 26-30) are numbered the same except preceded by the numeral '9'.

Figure 34:
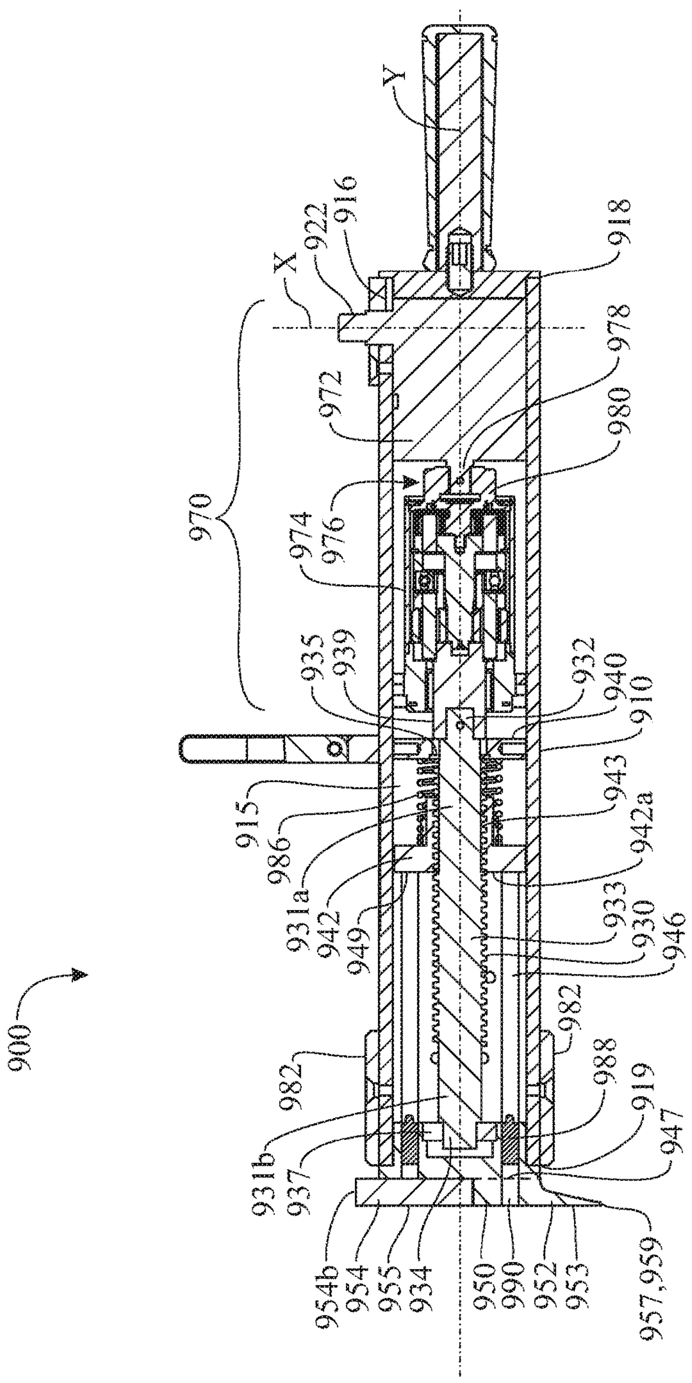
FIG. 34 presents a cross-sectional side elevation view of the handheld forcible entry device of FIG. 31, shown in a compressed state.

Similarly to the previous embodiments, the handheld forcible entry device 900 includes a tubular housing 910 which extends along a longitudinal axis "Y" (FIG. 34) between a proximal end 918 and a distal end 919 of the tubular housing 910. The housing 910 defines a housing interior 915. Similarly to the embodiment of FIG. 1, a torque application end 922 (FIG. 31) is provided at an exposed portion of the forcible entry device 900 and protrudes outwardly from the housing 910 through a port 916 formed on a side wall of the housing 910, the port 916 best shown in FIG. 32. Also similarly to the embodiment of FIG. 1, the torque application end 922 extends along and is configured to rotate about a torque application axis "X", which is arranged in a transverse direction generally perpendicular to the longitudinal axis "Y" of the tubular housing 910, as best shown in FIG. 34. Similarly to the torque application end 122 of the forcible entry device 100 of FIG. 1, the torque application end 922 is shaped to torsionally engage with a torque applicator, such as an exemplary powered torque applicator such as, but not limited to, the powered torque applicator 600 of FIG. 24. Similarly to the forcible entry device 800 of FIGS. 26-30, the torque application end 922 of the present embodiment is formed as a protruding end of a gear assembly 970 that will be described in greater detail hereinafter.

Similarly to the embodiment of FIGS. 1-17, the forcible entry device 900 further includes a lead screw 930 arranged in the interior 915 of the tubular housing 910. The lead screw 930 is formed about a lead screw axis oriented generally parallel to the longitudinal axis "Y" of the tubular housing 910; similarly to previous embodiments, the lead screw axis coincides with the longitudinal axis "Y" of the tubular housing 910. The lead screw 930 includes a threaded body 933 and first and second non-threaded portions **931*a* and 931*b* arranged proximally and distally from the threaded body 933, respectively. The lead screw 830 further includes a proximal end 932 and a distal end 934. The lead screw 930 is rotationally assembled to the tubular housing 910 and is rotatable about the lead screw axis. More specifically, a stationary thrust platform 940 is assembled to the tubular housing 910, and the proximal end 932 of the lead screw 930 is rotationally supported by a proximal end bearing 935 carried by the stationary thrust platform 940. In turn, the distal end 934 of the lead screw 930 is rotationally supported by the fixed wedge plate 950, and more particularly by a distal end bearing 937 carried by the fixed wedge plate 950. A movable platform 942 is threadably engaged with the threaded body 933 of the lead screw 930. For this purpose, the movable platform 942 includes a threaded aperture 943 which threadingly receives the threaded body 933 of the lead screw 930. A distally-biasing member, such as but not limited to a compression spring 986, is secured to the stationary thrust platform 940 and arranged between the stationary thrust platform 940 and the movable platform 942** for purposes that will be described hereinafter.

The forcible entry device 900 includes a gear assembly 970 comprising a 90-degree gear box 972 and a planetary gear system 974, which are coupled to one another via an intermediate connection 976 between a male termination 978 of the 90-degree gear box 972 and a female termination 980 of the planetary gear system 974. The male and female terminations 978 and 980 are coupled to rotate in unison about the lead screw axis "Y". An exposed end of the 90-degree gear box 972 provides the torque application end 922 of the forcible entry device 900. The torque application end 922 is an external hexagon shaft that will accept any portable battery-operated drill that will adapt and have the ability for powering the unit, for instance and without limitation. In turn, a distal termination of the planetary gear system 974 provides the gear connecting portion 939 of the gear assembly 970, the gear connecting portion 939 coupled to the proximal end 932 of the lead screw 930 providing unison rotation of the gear connecting portion 939 and the lead screw 930 about the lead screw axis "Y".

The 90-degree gear box 972 is configured to convert a rotation of the torque application end 922 about the torque application axis "X" into a rotation of the male termination 978. In turn, the planetary gear system 974 is configured to convert the rotation of the female termination 980 into a lower-speed and higher-torque rotation of the gear connecting portion 939 of the planetary gear system 974. Thus, the gear assembly 970, formed by the 90-degree gear box 972 and planetary gear system 974, is configured to convert a rotation of the torque application end 922 about the torque application axis "X" into a rotation of the gear connecting portion 939 of the gear assembly 970 (and thus of the lead screw 930) about the lead screw axis "Y" with an amplified torque, and thus an increased door-opening force.

Similarly to the previous embodiments, the forcible entry device 900 further includes a fixed wedge plate 950 and a movable wedge plate 954 including respective operating edges 957 and 959. The fixed wedge plate 950 is affixed to the distal end 919 of the tubular housing 910, and includes at least one through bore 951 (four through bores 951 in the present embodiment) and at least one cavity 990 (four cavities 990 in the present embodiment). In turn, the movable wedge plate 954 is carried by at least one column 946, and more particularly, by four spaced-apart, parallel columns 946. Each column 946 slidably extends through a respective one of the through bores 951 of the fixed wedge plate 950. Each column has a distal end 947 and a proximal end 949. The proximal end 947 and distal end 949 of each column 946 are assembled to the movable platform 942 and the movable wedge plate 954, respectively. Specifically, the proximal end 949 is fitted in a column receiving recess or countersink 948 in the movable platform 942, and the distal end 947 is fitted in a mounting aperture **954*a* formed in the movable wedge plate 954. Fasteners (not shown) can secure the columns 946 to the movable platform 942 and movable wedge plate 954**.

The forcible entry device 900 can further include at least one proximally-biasing member (two compression spring plungers 988 in the present embodiment). Each compression spring plunger 988 is housed in a respective cavity 990 of the fixed wedge plate 850. The compression spring plungers 988 extend axially, facing the movable wedge plate 940, and are configured to exert an axial force when compressed, for purposes that will be hereinafter described.

The forcible entry device 900 further includes four reinforcement plates 982 at the distal end 919 of the tubular housing 910. The four reinforcement plates 982 are installed around the tubular housing 910, and more specifically onto four respective sidewalls thereof, for increasing the stability and strength of the tubular housing 910, which in a preferred embodiment can be constructed from aluminum. The four reinforcement plates 982 include mounting holes for the insertion of respective fasteners (not shown) which distribute the pressure on tubular housing 910 and further contribute to increase the overall strength of the tubular housing 910 significantly.

Figure 31:
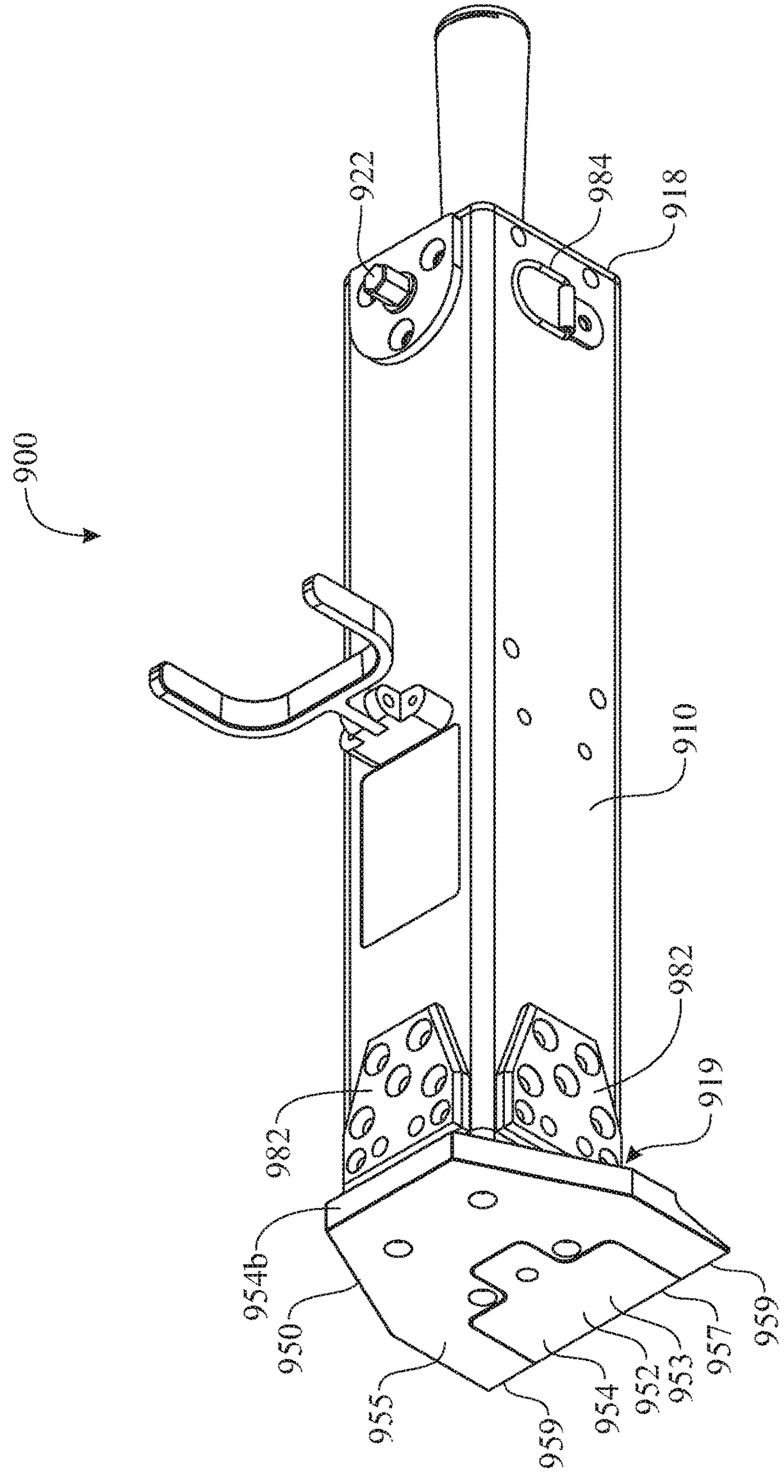
FIG. 31 presents an isometric view of a fourth exemplary handheld forcible entry device in accordance with the present invention, comprising a 90-degree gearbox and a planetary gear system.
Figure 32:
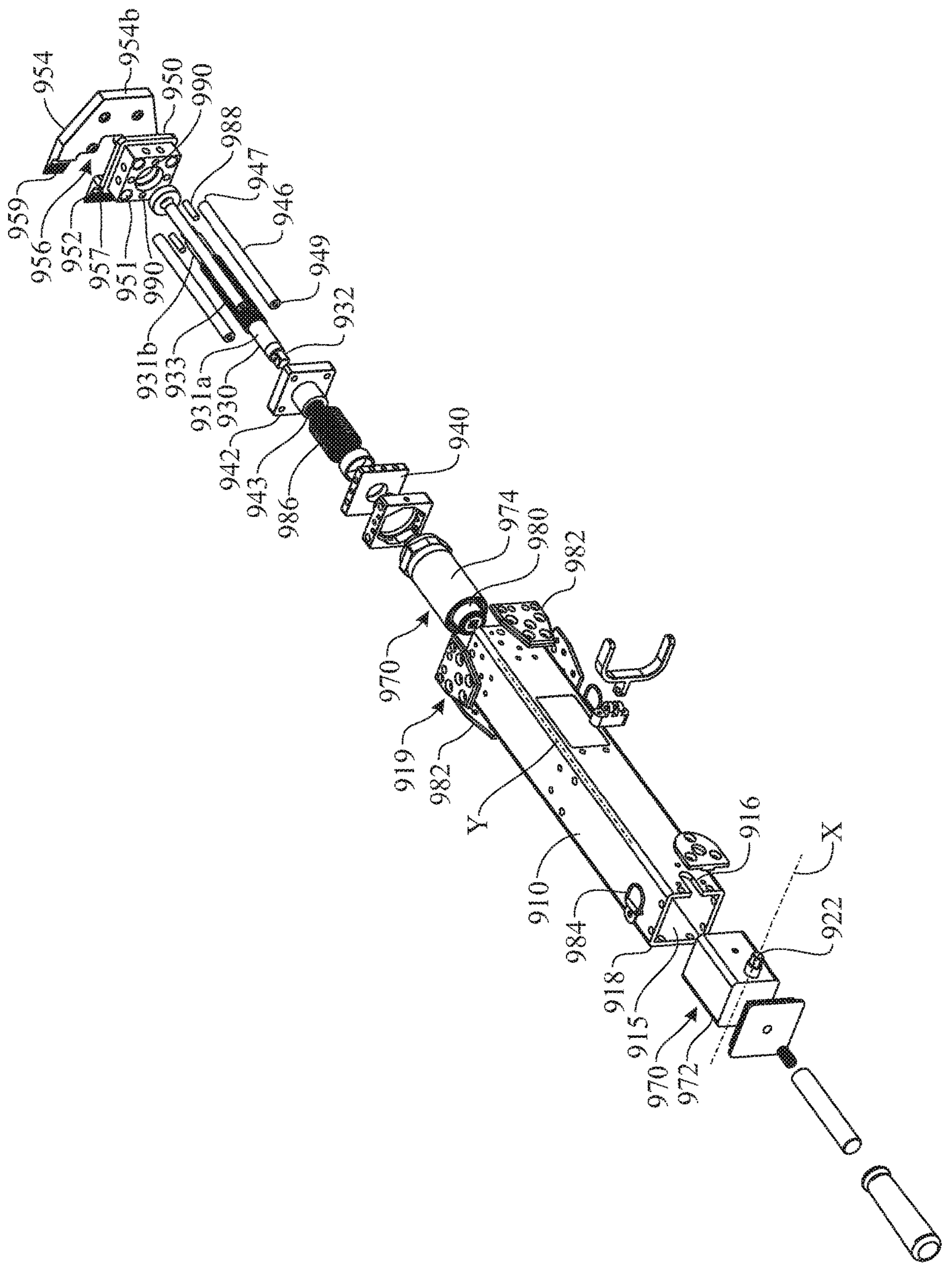
FIG. 32 presents an exploded perspective view of the handheld forcible entry device of FIG. 31.
Figure 33:
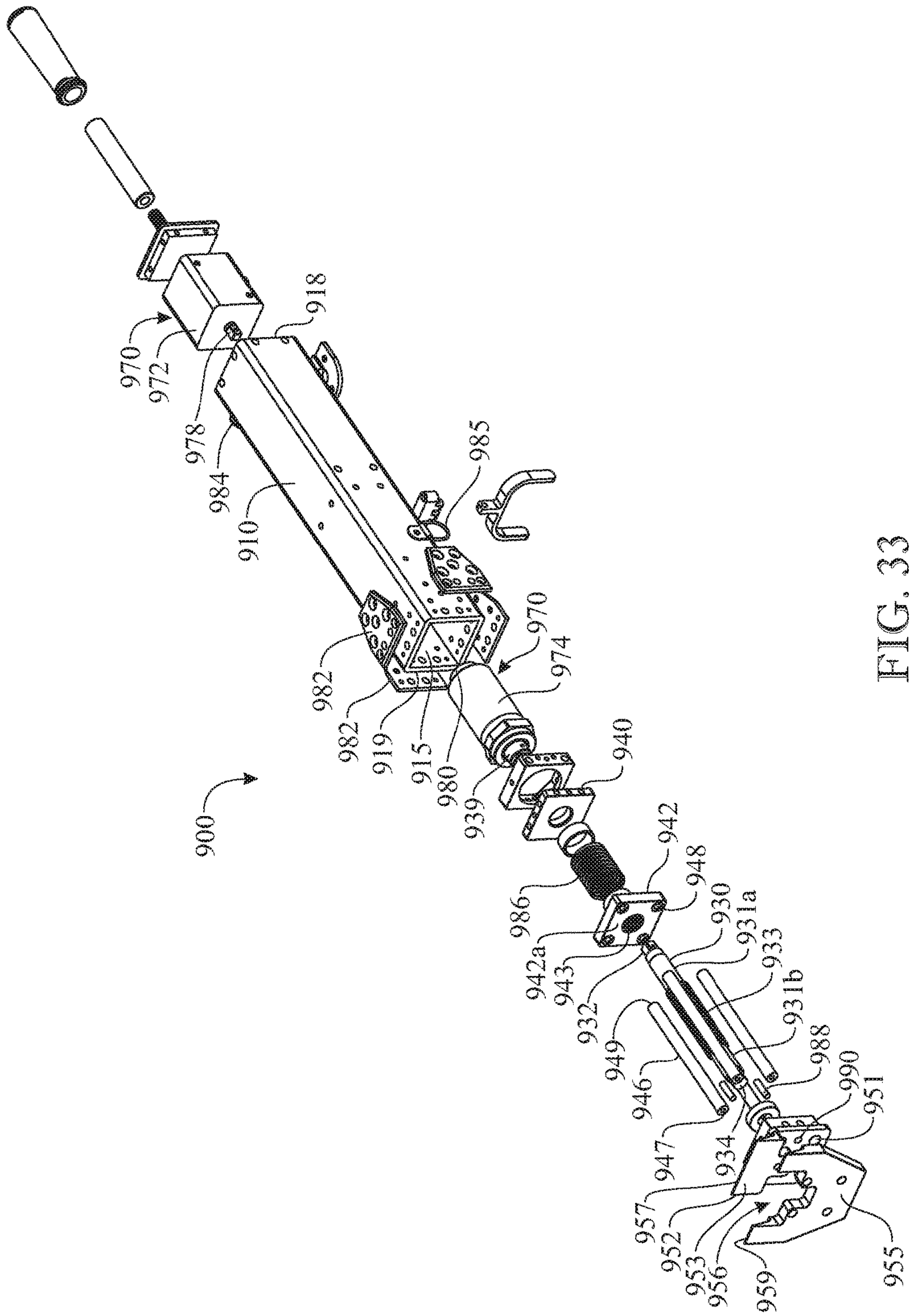
FIG. 33 presents another exploded perspective view of the handheld forcible entry device of FIG. 31, shown from an opposite end.

In addition, the present forcible entry device 900 comprises two D-rings 984, 985 attached to the tubular housing 910. The D-rings 984, 985 are located on opposite sidewalls of the tubular housing 910. A first D-ring 984 is located near the distal end 918 of the tubular housing 910 and near the torque application end 922, as shown in FIGS. 31 and 32. The other D-ring 985 is located closer to the proximal end 919 of the tubular housing 910, as shown in FIG. 33. The D-rings 984, 985 are specifically designed and placed for the installation of a shoulder strap for carrying the forcible entry device 910 and leaving a hands-free situation for the single operator user.

Figure 35:
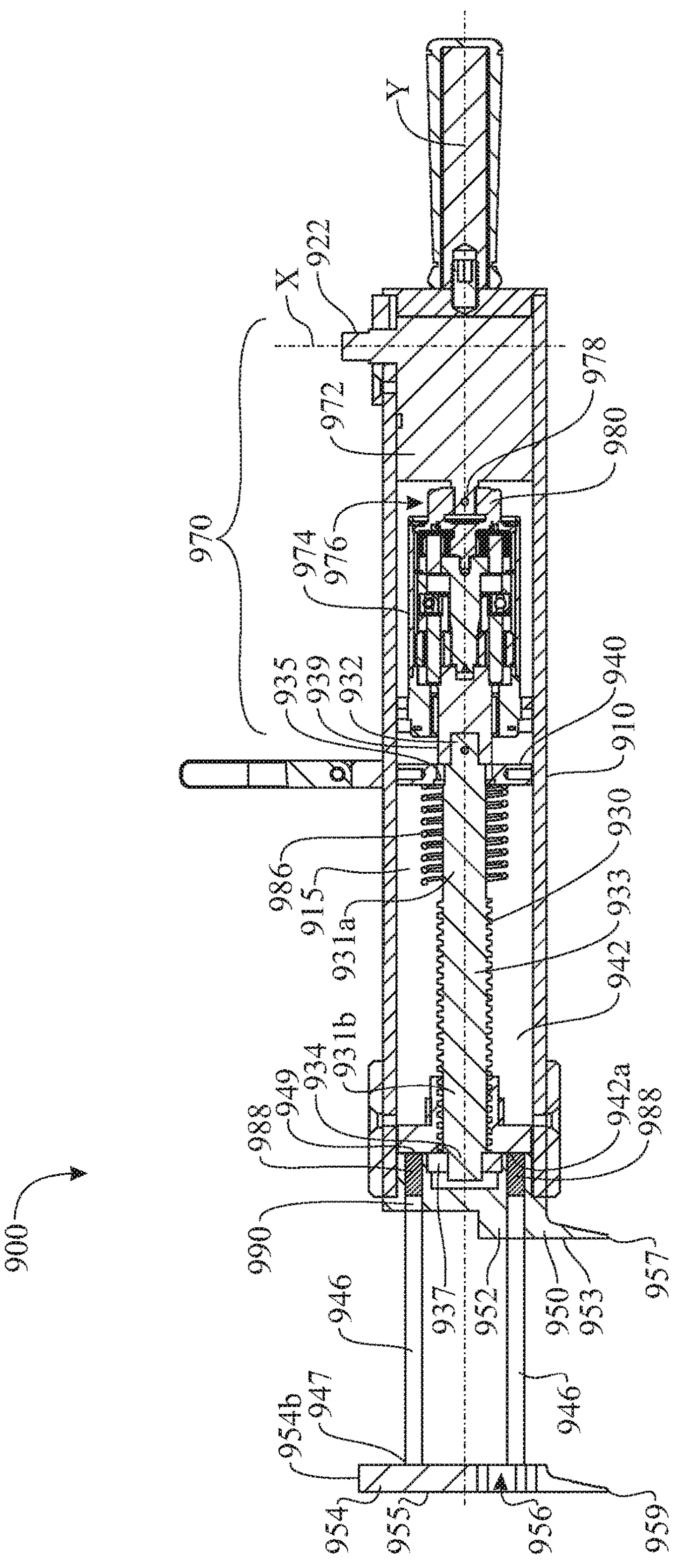
FIG. 35 presents a cross-sectional side elevation view of the handheld forcible entry device of FIG. 31, shown in an expanded state.

Operation of the forcible entry device 900 is illustrated in FIGS. 34 and 35. Initially, the forcible entry device 900 is arranged in a neutral, compressed configuration as shown in FIG. 34, in which the movable wedge plate 954 is fitted onto the fixed wedge plate 950 so that a foot 952 of the fixed wedge plate 950 providing the operating edge 957 nests inside a clearance 956 of the movable wedge plate 954. In this initial position, the operating edges 957 and 959 of the fixed and movable wedge plates 950 and 954 are aligned with one another forming a single, linear edge, and respective exposed surfaces 953 and 955 of the fixed and movable wedge plates 950 and 954 are coplanar. In this neutral position, the movable platform 942 is arranged in a proximal position relative to the lead screw 930, in such a way that the threaded aperture 943 of the movable platform 942 is in registration with the first non-threaded portion 931*a* of the lead screw 930 and is not threaded on the threaded body 933 of the lead screw 930, but is adjacent to said threaded body 933. Furthermore, in this initial, neutral position the spring 986 is compressed and exerting a distally-oriented force on the movable platform 942.

Similarly to previous embodiments, in this initial position a user can easily and swiftly insert the single, linear edge 957, 959 into a gap between a door edge and a door frame (such as the door edge 712 and door frame 720 shown in FIG. 25). Where the gap between the door edge 712 and door frame 920 is extremely tight or no gap exists, the single, linear edge 957, 959 can be placed adjacent to the gap and the user may then strike an exposed back side 954*b* of the movable wedge plate 954 (the back side 954*b* being an edge or side of the movable wedge plate 954 opposite to the linear edge 959 of the movable wedge plate 954) with an ax or hammer to drive in the linear edge 957, 959 in between the door edge 712 and door frame 720. It must be noted that this striking action on a back side of the movable wedge plate may also be carried out on analogous back sides of the forcible entry devices 100, 400 and 800 of the previous embodiments. Once the operational edge 957, 959 of the forcible entry device 900 is fitted in between the door edge 712 and door frame 720, the user operates forcible entry device 900, for instance using powered torque applicator 600 (not shown) to exert a torque on the torque application end 922 of the forcible entry device 900 about the transverse axis "X", causing the torque application end 922 to rotate. The gear assembly 970 converts the rotation of the torque application end 922 about the transverse axis "X" to a rotation of the gear connecting portion 939 of the gear assembly 970 about the lead screw axis "Y". The gear connecting portion 939 of the gear assembly 970 and the lead screw 930 then rotate in unison about the lead screw axis "Y". The distally-oriented force exerted by the spring 986 causes the movable platform 942 to move slightly towards and onto the threaded body 933 of the lead screw 930 and the threaded aperture 943 of the movable platform 942 to initially mesh with said threaded body 933. Continued operation of the powered torque applicator 600 causes the lead screw 930 to further rotate, rotation of the lead screw 930 causing a translation of the movable platform 942 in a direction parallel to the lead screw axis "Y". The translation of the movable platform 942 causes a translation of the columns 946 by pushing or pulling the columns 946. Translation of the columns 946, in turn, moves the movable wedge plate 954 relatively to the fixed wedge plate 950, either towards or away from the fixed wedge plate 950 in dependence of the direction of rotation of the powered torque applicator 600. Thus, by appropriately rotating the powered torque applicator 600, the operating edge 959 of the movable wedge plate 954 is separated from the operating edge 957 of the fixed wedge plate 950, causing the door edge 712 and door frame 720 to separate from one another allowing to open the door.

As mentioned heretofore, the present gear assembly 970 includes gear box 972 configured to convert a rotation of the torque application end 922 about the torque application axis "X" into a rotation of the male termination 978, and a planetary gear system 974 configured to convert the rotation of the female termination 980 into a lower-speed and higher-torque rotation of the gear connecting portion 939 of the planetary gear system 974. In some embodiments, the planetary gear system 974 can deliver in excess of 26,000 lb. ft. of torque forces, using only an input driving force of only 35 lb. ft. on the torque application end 922. Thus, virtually any battery-operated drill can be used to operate the forcible entry device 900, as most drills have can provide a minimum of 35 lb. ft. of torque. The drill chuck adapts to the torque application end 922 hexagon shaft of the 90-degree gear box 972, and operates the forcible entry device 900. Retraction of the spreading fixed and movable wedge plates 950, 954 is attained by setting the drill in reverse; operating the drill in reverse causes the movable wedge plate 954 to retract back to its starting or compressed position of FIG. 34.

Continued operation of the powered torque applicator 600 eventually brings the movable platform 942, columns 946 and movable wedge plate 954 to a fully extended position shown in FIG. 35. In this fully extended position, the movable platform 942 has translated distally to a neutral position in which the threaded aperture 943 of the movable platform 942 is in registration with the second non-threaded portion 931*b* of the lead screw 930 and is no longer engaged with the threaded body 933 of the lead screw 930, but rather is adjacent to said threaded body 933. In this neutral position, a distally-oriented, end surface 942*a* of the movable platform 942 contacts, pushes and compresses the compression spring plungers 988, such that the compression spring plungers 988 are compressed and exert a proximally-oriented force on the end surface 942*a* of the movable platform 942. In this neutral position, continued operation of the powered torque applicator 600 in the same, expanding direction does not cause the movable platform 942 to further translate distally, as the threaded aperture 943 is disengaged from the threaded body 933; thus, the forcible entry device 900 is protected from excessive operation of the powered torque applicator 600 in the expanding direction. In order to return to the compressed position of FIG. 34 from the neutral, expanded position of FIG. 35, the user must reverse the powered torque applicator 600 and operate said powered torque applicator 600 to rotate the lead screw 930 in the opposite direction. As soon as the powered torque applicator 600 is operated in reverse mode and the lead screw 933 begins to rotate, the compressed spring plungers 988 push the movable platform 942 proximally, sufficiently to cause the threaded aperture 943 of the movable platform 942 to initially thread with the threaded body 933 of the lead screw 930. Continued operation of the powered torque applicator 600 in said reverse mode cause the movable platform 942 to translate along the lead screw 930 (by a relative rotation of the threaded body 933 of the lead screw 930 and the threaded aperture 943 of the movable platform 942) and eventually reach the compressed, neutral position of FIG. 34. Once the compressed, neutral position of FIG. 34 is reached, continued operation of the powered torque applicator 600 in the reverse mode does not cause the movable platform 942 to translate further in a proximal direction, as the threaded aperture 943 of the movable platform 942 is once again disengaged from the threaded body 933 of the lead screw 930. Thus, this compressed, neutral configuration protects the forcible entry device 900 from accidental operation of the device to further compress the fixed and movable wedge plates 950 and 954 once the fixed and movable wedge plates 950 and 954 are resting on one another.

It must be noted that, similarly to the previous embodiments, the forcible entry devices 800, 900 of FIGS. 26-35 can be operated by a manual torque applicator (e.g., the operational drive ratchet 200 of FIGS. 26-30), a powered torque applicator (e.g., the power torque applicator 600 of FIG. 18) or a breaker bar, such as when additional power rating is required.

While the preferred embodiments of the invention have been described above, it will be recognized and understood that various modifications can be made in the invention and the appended claims are intended to cover all such modifications which may fall within the spirit and scope of the invention.

What is claimed is:

1. A handheld forcible entry device, comprising:

a tubular housing formed extending along a longitudinal axis between a proximal end and a distal end of the tubular housing;

a torque application end provided at an exposed portion of said forcible entry device, said torque application end configured to rotate about a torque application axis, said torque application axis arranged in a transverse direction generally perpendicular to said longitudinal axis of the tubular housing;

a lead screw comprising a threaded body extending between a proximal end and a distal end of the lead screw, wherein said lead screw is housed within and rotationally assembled to said tubular housing, wherein said lead screw is formed about a lead screw axis oriented generally parallel to said longitudinal axis of the tubular housing;

a gear assembly comprising a gear connecting portion coupled to the proximal end of the lead screw providing unison rotation therewith about the lead screw axis, the gear assembly configured to convert a rotation of the torque application end about the torque application axis into a rotation of the gear connecting portion of the gear assembly about the lead screw axis;

a movable platform threadably engaged with said threaded body of the lead screw;

a fixed wedge plate comprising an operating edge, said fixed wedge plate being assembled to said distal end of the tubular housing;

a movable wedge plate comprising an operating edge; and at least one column, each column of said at least one column having a distal end and a proximal end, said proximal end of said each column assembled to said movable platform and said distal end of said each column assembled to said movable wedge plate; wherein a torque applied to said torque application end rotates said torque application end, which in turn rotates said gear connecting portion of said gear assembly, which in turn rotates said lead screw in unison therewith, rotation of the lead screw causing a translation of said movable platform in a direction parallel to said lead screw axis, said translation of said movable platform causing a translation of said at least one column, said translation of said at least one column moving said movable wedge plate relatively to said fixed wedge plate.

2. The handheld forcible entry device of claim 1, said fixed wedge plate further comprising at least one through bore, wherein each column of said at least one column extends through a respective bore of said at least one through bore.

3. The handheld forcible entry device of claim 1, said fixed wedge plate further comprising a foot, wherein said operating edge is formed along an edge of said foot.

4. The handheld forcible entry device of claim 3, said movable wedge plate further comprising a clearance, wherein said foot nests within said clearance.

5. The handheld forcible entry device of claim 4, said movable wedge plate and said foot of said fixed wedge plate further comprising a respective exposed surface, wherein said respective exposed surfaces of the movable wedge plate and the foot of the fixed wedge plate are coplanar when said foot is positioned nesting within said clearance of said movable wedge plate.

6. The handheld forcible entry device of claim 1, wherein said at least one column comprises a plurality of columns arranged in spaced-apart and parallel relationship with one another.

7. The handheld forcible entry device of claim 1, further comprising a stationary thrust platform assembled to said tubular housing, wherein said proximal end of said lead screw is rotationally supported by said stationary thrust platform.

8. The handheld forcible entry device of claim 1, wherein the distal end of the lead screw is rotationally supported by said fixed wedge plate.

9. The handheld forcible entry device of claim 1, further comprising a torque applicator engaged with said torque application end of said torque-input drive shaft for unison rotation therewith.

10. The handheld forcible entry device of claim 9, wherein said torque applicator is manually-operable.

11. The handheld forcible entry device of claim 9, wherein said torque applicator is powered.

12. The handheld forcible entry device of claim 1, wherein the lead screw comprises a proximal, non-threaded portion, and further wherein the forcible entry device is configured to adopt a neutral, compressed position in which the movable plate is disengaged from the threaded body of the lead screw and is in registration with the proximal, non-threaded portion of the lead screw and further in which the movable platform is biased towards the threaded body of the lead screw.

13. The handheld forcible entry device of claim 1, wherein the lead screw comprises a distal, non-threaded portion, and further wherein the forcible entry device is configured to adopt a neutral, extended position in which the movable plate is disengaged from the threaded body of the lead screw and is in registration with the distal, non-threaded portion of the lead screw and further in which the movable platform is biased towards the threaded body of the lead screw.

14. The handheld forcible entry device of claim 1, wherein the forcible entry device is configured to adopt a compressed position in which the operating edges of the fixed wedge plate and movable wedge plate are aligned forming a single operating edge.

15. The handheld forcible entry device of claim 14, wherein, when the forcible entry device is in the compressed position, an edge of the movable wedge plate opposite to the single operating edge is exposed and strikable thereon with a tool.

16. A handheld forcible entry device, comprising:

a tubular housing formed extending along a longitudinal axis between a proximal end and a distal end of the tubular housing;

a torque application end provided at an exposed portion of said forcible entry device, said torque application end configured to rotate about a torque application axis, said torque application axis arranged in a transverse direction generally perpendicular to said longitudinal axis of the tubular housing;

a lead screw comprising a threaded body extending between a proximal end and a distal end of the lead screw, wherein said lead screw is housed within and rotationally assembled to said tubular housing, wherein said lead screw is formed about a lead screw axis oriented generally parallel to said longitudinal axis of the tubular housing;

a gear assembly comprising a gear connecting portion coupled to the proximal end of the lead screw providing unison rotation therewith about the lead screw axis, the gear assembly configured to convert a rotation of the torque application end about the torque application axis into a rotation of the gear connecting portion of the gear assembly about the lead screw axis;

a movable platform threadably engaged with said threaded body of the lead screw;

a fixed wedge plate comprising an operating edge, said fixed wedge plate being assembled to said distal end of the tubular housing;

a movable wedge plate comprising an operating edge;

at least one column, each column of said at least one column having a distal end and a proximal end, said proximal end of said each column assembled to said movable platform and said distal end of said each column assembled to said movable wedge plate; and a torque applicator engageable with said torque application end of said torque-input drive shaft for unison rotation therewith; wherein a torque applied to said torque application end rotates said torque application end, which in turn rotates said gear connecting portion of said gear assembly, which in turn rotates said lead screw in unison therewith, rotation of the lead screw causing a translation of said movable platform in a direction parallel to said lead screw axis, said translation of said movable platform causing a translation of said at least one column, said translation of said at least one column moving said movable wedge plate relatively to said fixed wedge plate.

17. The handheld forcible entry device of claim 16, said fixed wedge plate further comprising a foot, wherein said operating edge is formed along an edge of said foot.

18. The handheld forcible entry device of claim 17, said movable wedge plate further comprising a clearance, wherein said foot nests within said clearance.

19. The handheld forcible entry device of claim 18, said movable wedge plate and said foot of said fixed wedge plate further comprising a respective exposed surface, wherein said respective exposed surfaces of the movable wedge plate and the foot of the fixed wedge plate are coplanar when said foot is positioned nesting within said clearance of said movable wedge plate.

20. A handheld forcible entry device, comprising:

a tubular housing formed extending along a longitudinal axis between a proximal end and a distal end of the tubular housing;

a torque application end provided at an exposed portion of said forcible entry device, said torque application end configured to rotate about a torque application axis, said torque application axis arranged in a transverse direction generally perpendicular to said longitudinal axis of the tubular housing;

a lead screw comprising a threaded body extending between a proximal end and a distal end of the lead screw, wherein said lead screw is housed within and rotationally assembled to said tubular housing, wherein said lead screw is formed about a lead screw axis oriented generally parallel to said longitudinal axis of the tubular housing;

a gear assembly comprising a gear connecting portion coupled to the proximal end of the lead screw providing unison rotation therewith about the lead screw axis, the gear assembly configured to convert a rotation of the torque application end about the torque application axis into a rotation of the gear connecting portion of the gear assembly about the lead screw axis;

a movable platform threadably engaged with said threaded body of the lead screw;

a fixed wedge plate comprising an operating edge, said fixed wedge plate being assembled to said distal end of the tubular housing;

a movable wedge plate comprising an operating edge; and at least one column, each column of said at least one column having a distal end and a proximal end, said proximal end of said each column assembled to said movable platform and said distal end of said each column assembled to said movable wedge plate; wherein a torque applied to said torque application end rotates said torque application end, which in turn rotates said gear connecting portion of said gear assembly, which in turn rotates said lead screw in unison therewith, rotation of the lead screw causing a translation of said movable platform in a direction parallel to said lead screw axis, said translation of said movable platform causing a translation of said at least one column, said translation of said at least one column moving said movable wedge plate relatively to said fixed wedge plate; and further wherein said movable wedge plate is configured to adopt a compressed position relative to said fixed wedge plate in which respective exposed surfaces of said fixed and movable wedge plates are coplanar.

* * * * *